(12) United States Patent
Beutel et al.

(10) Patent No.: US 8,293,198 B2
(45) Date of Patent: *Oct. 23, 2012

(54) PROCESS OF DIRECT COPPER EXCHANGE INTO NA+-FORM OF CHABAZITE MOLECULAR SIEVE, AND CATALYSTS, SYSTEMS AND METHODS

(75) Inventors: Tilman W. Beutel, Neshanic Station, NJ (US); Ivor Bull, Hopewell Junction, NY (US); Ahmad Moini, Princeton, NJ (US); Michael Breen, Erie, PA (US); Martin Dieterle, Jersey City, NJ (US); Saeed Alerasool, Princeton Junction, NJ (US); Xinsheng Liu, Edison, NJ (US); Wenyong Lin, Edison, NJ (US); Barbara Slawski, North Royalton, OH (US); Ulrich Mueller, Neustadt (DE)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/970,545

(22) Filed: Dec. 16, 2010

(65) Prior Publication Data

US 2011/0165051 A1 Jul. 7, 2011

Related U.S. Application Data

(60) Provisional application No. 61/287,704, filed on Dec. 18, 2009.

(51) Int. Cl.
*B01D 53/56* (2006.01)
*B01D 53/94* (2006.01)
*B01J 29/00* (2006.01)
*B01J 29/072* (2006.01)
*F01N 3/10* (2006.01)
*F01N 3/28* (2006.01)

(52) U.S. Cl. .................. 423/213.2; 423/239.2; 423/700; 502/60; 502/345; 502/439; 60/299

(58) Field of Classification Search ................ 502/60, 502/345, 439; 423/700, 213.2, 239.2; 60/299
See application file for complete search history.

(56) References Cited

U.S. PATENT DOCUMENTS 3,346,328 A * 10/1967 Sergeys et al. ............. 423/213.2
4,220,632 A 9/1980 Pence et al.
(Continued)

FOREIGN PATENT DOCUMENTS
DE 394541 A1 6/1990
(Continued)

OTHER PUBLICATIONS

Final Office Action in U.S. Appl. No. 12/612,142, mailed Jun. 10, 2011, 21 pgs.
(Continued)

*Primary Examiner* — Timothy Vanoy
(74) *Attorney, Agent, or Firm* — Melanie L. Brown

(57) ABSTRACT

Disclosed are processes for the preparation of copper containing molecular sieves with the CHA structure wherein the copper is exchanged into the $Na^+$-form of the Chabazite, using a liquid copper solution wherein the concentration of copper is in the range of about 0.001 to about 0.4 molar. Also described are copper containing molecular sieves with the CHA structure, catalysts incorporating molecular sieves, systems and methods for their use.

20 Claims, 3 Drawing Sheets

U.S. PATENT DOCUMENTS

| | | | |
|---|---|---|---|
| 4,297,328 A | 10/1981 | Ritcher et al. | |
| 4,440,871 A | 4/1984 | Lok et al. | |
| 4,544,538 A | 10/1985 | Zones | |
| 4,567,029 A | 1/1986 | Wilson et al. | |
| 4,735,927 A | 4/1988 | Gerdes et al. | |
| 4,735,930 A | 4/1988 | Gerdes et al. | |
| 4,861,743 A | 8/1989 | Flank et al. | |
| 4,867,954 A | 9/1989 | Staniulis et al. | |
| 4,874,590 A | 10/1989 | Staniulis et al. | |
| 4,961,917 A | 10/1990 | Byrne | |
| 5,024,981 A | 6/1991 | Speronello et al. | |
| 5,041,270 A | 8/1991 | Fujitani et al. | |
| 5,096,684 A | 3/1992 | Guth et al. | |
| 5,110,777 A | 5/1992 | Kamiyama et al. | |
| 5,233,117 A | 8/1993 | Barger | |
| 5,313,792 A | 5/1994 | Katoh et al. | |
| 5,417,949 A | 5/1995 | McWilliams et al. | |
| 5,477,014 A | 12/1995 | Dunne et al. | |
| 5,516,497 A | 5/1996 | Speronello et al. | |
| 5,589,147 A | 12/1996 | Farnos et al. | |
| 5,589,149 A | 12/1996 | Garland et al. | |
| 5,733,837 A | 3/1998 | Nakatsuji et al. | |
| 5,884,473 A | 3/1999 | Noda et al. | |
| 6,139,808 A | 10/2000 | Mizuno et al. | |
| 6,162,415 A | 12/2000 | Liu et al. | |
| 6,171,556 B1 | 1/2001 | Burk et al. | |
| 6,316,683 B1 | 11/2001 | Janssen et al. | |
| 6,319,487 B1 | 11/2001 | Liu et al. | |
| 6,350,298 B1 | 2/2002 | Su et al. | |
| 6,376,562 B1 | 4/2002 | Ihm et al. | |
| 6,395,674 B1 | 5/2002 | Fung et al. | |
| 6,503,863 B2 | 1/2003 | Fung et al. | |
| 6,569,394 B2 | 5/2003 | Fischer et al. | |
| 6,576,203 B2 | 6/2003 | Abe et al. | |
| 6,606,856 B1 | 8/2003 | Brown et al. | |
| 6,685,905 B2 | 2/2004 | Mertens et al. | |
| 6,696,032 B2 | 2/2004 | Mertens et al. | |
| 6,709,644 B2 | 3/2004 | Zones et al. | |
| 6,974,889 B1 | 12/2005 | Verduijn et al. | |
| 7,014,827 B2 | 3/2006 | Mertens et al. | |
| 7,049,261 B2 | 5/2006 | Nam et al. | |
| 7,094,389 B2 | 8/2006 | Cao et al. | |
| 7,182,927 B2 | 2/2007 | Tran et al. | |
| 7,229,597 B2 | 6/2007 | Patchett et al. | |
| 7,601,662 B2 | 10/2009 | Bull et al. | |
| 2001/0038812 A1 | 11/2001 | Yavuz et al. | |
| 2001/0043896 A1 | 11/2001 | Domesle et al. | |
| 2002/0016252 A1 | 2/2002 | Takahashi et al. | |
| 2002/0084223 A1 | 7/2002 | Feimer et al. | |
| 2003/0069449 A1 | 4/2003 | Zones et al. | |
| 2004/0082466 A1 | 4/2004 | Cao et al. | |
| 2004/0098973 A1 | 5/2004 | Tennison et al. | |
| 2004/0166035 A1 | 8/2004 | Noda et al. | |
| 2004/0171476 A1 | 9/2004 | Nam et al. | |
| 2004/0209760 A1 | 10/2004 | Yoshikawa | |
| 2005/0031514 A1 | 2/2005 | Patchett et al. | |
| 2005/0096214 A1 | 5/2005 | Janssen et al. | |
| 2006/0039843 A1 | 2/2006 | Patchett et al. | |
| 2006/0115403 A1 | 6/2006 | Yuen | |
| 2006/0228283 A1 | 10/2006 | Malyala et al. | |
| 2007/0000243 A1 | 1/2007 | Liu et al. | |
| 2007/0043249 A1 | 2/2007 | Cao et al. | |
| 2007/0149385 A1 | 6/2007 | Liu et al. | |
| 2007/0286798 A1 | 12/2007 | Cao et al. | |
| 2008/0202107 A1 | 8/2008 | Boorse et al. | |
| 2008/0241060 A1 | 10/2008 | Li et al. | |
| 2008/0317999 A1 | 12/2008 | Patchett et al. | |
| 2009/0048095 A1 | 2/2009 | Li et al. | |
| 2009/0060809 A1 | 3/2009 | Shioya et al. | |
| 2009/0196812 A1 | 8/2009 | Bull et al. | |
| 2010/0092362 A1 | 4/2010 | Li et al. | |
| 2010/0290963 A1 | 11/2010 | Andersen et al. | |
| 2011/0165052 A1* | 7/2011 | Beutel et al. | 423/239.2 |
| 2011/0182791 A1* | 7/2011 | Fedeyko et al. | 423/237 |
| 2011/0200505 A1* | 8/2011 | Cavataio et al. | 423/213.2 |

FOREIGN PATENT DOCUMENTS

| | | |
|---|---|---|
| DE | 10059520 | 5/2001 |
| EP | 0396085 | 11/1990 |
| EP | 0624393 A1 | 11/1994 |
| EP | 0773057 A1 | 5/1997 |
| EP | 0950800 A2 | 10/1999 |
| EP | 1837489 A1 | 9/2007 |
| JP | 6-48725 | 2/1994 |
| JP | 05-057194 | 9/1994 |
| WO | WO-99/56859 | 11/1999 |
| WO | WO-03/035549 A1 | 5/2003 |
| WO | WO-2007/004774 A1 | 1/2007 |
| WO | WO-2007/005308 A2 | 1/2007 |
| WO | WO-2008/019585 A1 | 2/2008 |
| WO | 2008077590 A2 | 7/2008 |
| WO | 2008106519 A1 | 9/2008 |
| WO | WO-2008/118434 A1 | 10/2008 |
| WO | 2008132452 A2 | 11/2008 |
| WO | WO-2008/132452 A2 | 11/2008 |
| WO | 2009141324 A1 | 11/2009 |
| WO | 2010043891 A1 | 4/2010 |

OTHER PUBLICATIONS

Anderson, Paul J. et al., "Small pore molecular sieve supported transition metal catalysts for the selective catalytic reduction of NOx with $NH_3$", Abstract, 1 pg.

Schmieg, Steven J., et al., "Thermal Durability of $NH_3$-SCR Catalysts for Diesel NOx Reduction", 1 pgs.

Deka, U., et al, "Insight into the nature of the active site in Cu-CHA for $NH_3$-SCR", University Utrecht, Netherlands, 1 pgs.

"Chinese Journal of Catalysis", *Thermal and Hydrothermal Stability of SAPO-34 Molecular Sieve*, vol. 17, No. 6 Nov. 1996, 9 pgs.

"Fourth International Congress on Catalysis and Automotive Pollution Control", Apr. 1997, 7.

Gabriele Centi Declaration of Sep. 22, 2010, 11 pgs.

Machine Translation from EPO of DE 394541 A1, 8 pgs, Jun. 1990.

Non-Final Office Action in U.S. Appl. No. 12/361,980, mailed Sep. 22, 2010, 26 pgs.

Non-Final Office Action, dated Feb. 26, 2010 in U.S. Appl. No. 12/480,360, 19 pgs.

PCT International Search Report and Written Opinion in PCT/US2009/032610, Jul. 16, 2009, 20 pgs.

PCT International Search Report and Written Opinion for PCT/US2008/055140, 11 pgs, (2008).

Reexam Order in Pat. No. 7,601,662, 18 pgs, Nov. 16, 2010.

Reexamination Request in Pat. No. 7,601,662, 35 pgs, Nov. 16, 2010.

Request for Inter Partes Reexamination, dated Sep. 28, 2010, 77 pgs.

U.S. Appl. No. 10/634,659, filed Aug. 5, 2003.

Non-Final Office Action mailed Jan. 13, 2009 for U.S. Appl. No. 12/038,423 mailed Jan. 13, 2009, 16 pgs.

Akolekar, Deepak B. et al., "FTIR investigations of the adsorption and disproportionation of NO on Cu-exchanged silicoaluminophosphate of type 34", *J. Chem. Soc., Faraday Trans.*, 94(1) 1998, 155-160.

Amiridis, Michael D. et al., "Selective catalytic reduction of nitric oxide by hydrocarbons", *Applied Catalysis* 1996, 203-227 pgs.

Ashtekar, Sunil et al., "Small-Pore Molecular Sieves SAPO-34 and SAPO-44 with Chabazite Structure: A Study of Silicon Incorporation", *J. Phys. Chem. 1994*, 98 1994, 4878-4883.

Baerlocher, CH. et al., "Atlas of Zeolite Framework Types", *Elsevier—Fifth Revised Edition* 2001, 5 pages.

Barger, Paul T. et al., "Hydrothermal Stability of SAPO-34 in the Methanol-to-Olefins Process", *Tha Arabian Journal for Science and Engineering*, vol. 21, No. 2 Apr. 1996, 10.

Barthomeuf, Denise, "Journal: NATO ASI Series, Series C: Mathematical and Physical Sciences Issue 444", *Generation of acidity (amount and strength) in siliconaluminophosphates (SAPO zeolites), Examples of SAPO-5* ; pp. 375-390 1994, 17 pgs.

Breck, Donald W., "Zeolite Molecular Sieves", *John Wiley & Sons, A Wiley-Interscience Publication* 1974, 6 pgs.

Centi, G. et al., "Role of the Nature of Copper Sites in the Activity of Copper-Based Catalysts for NO Conversion", *Research on Chemical Intermediates*, 17 1992, 125-135 pgs.

Chen, Jiesheng et al., "Silicoaluminophosphate No. eighteen (SAPO-18): a new mircoporous solid acid catalyst", *Catalysis Letters 28* 1994, 241-248.

Chung, Sung Y. et al., "Effect of Si/Alratio of Mordenite and ZSM-5 type Zeolite Catalysts on Hydrothermal Stability for NO Reduction by Hydrocarbons", *Studies in Surface Science Catalysis*, vol. 130 2000, 1511-1516.

Dedecek, Jiri et al., "Effect of Framework Charge Density on Catalytic Activity of Copper Loaded Molecular Sieves of Chabazite Structure in Nitrogen (II) Oxide Decomposition", *Collect. Czech. Chem. Commun.* (vol. 65) 2000, 343-351 pgs.

Dedecek, J. et al., "Siting of the Cu+ ions in dehydrated ion exchanged synthetic and natural chabasites: a Cu+ photoluminescence study", *Microporous and Mesoporous Materials 32* 1999, 13 pgs.

Frache, A. et al., "Catalytic DeNOx activity of cobalt and copper ions in microporous MeALPO-34 and MeAPSO-34", *Catalysis Today 75* 2002, 359-365.

Frache, A. et al., "CuAPSO-34 catalysts for N2O decomposition in the presence of H2O. A study of zeolite structure stability in comparison to Cu-SAPO-34 and Cu-ZSM-5", *Topics in Catalysis* vol. 22, Nos. 1/2 2003, 5.

Frache, A. et al., "Spectroscopic characterisation of microporous aluminophosphate materials with potential application in environmental catalysis", *Catalysis Today 77* 2003, 371-384.

Frache, A. et al., "Synthesis, Spectroscopic and Catalytic Properties of Cobalt and Copper Ions in Aluminophosphates with Chabasite-Like Structure, Studies of the NO Reactivity", *Studies in Surface Science and Catalysis 140* 2001, 269-277.

Hartmann, Martin et al., "Transition-Metal Ions in Aluminophosphate and Silicoaluminophosphate Molecular Sieves: Location, Interaction with Adsorbates and Catalytic Properties", *Chem. Rev. 99* (3) 1999, 635-663.

Heck, Ronald M. et al., "Catalytic Air Pollution Control", *A John Wiley & Sons, Inc., Publication—Wiley-Interscience* 2002, 3 pgs.

Ishihara, Tatsumi et al., "Copper Ion Exchanged Silicoaluminophosphate (SAPO) as a Thermostable Catalyst for Selective Reduction of NOx with Hydrocarbons", *Studies in Surface Science and Catalysis*, vol. 84 (1994), 1493-1500.

Ishihara, Tatsumi et al., "Copper Ion-Exchanged SAPO-34 as a Thermostable Catalyst for Selective Reduction of NO with C3H6", *Journal of Catalysis*, vol. 169 1997, 10 pgs.

Ishihara, Tatsumi et al., "Selective Reduction of Nitrogen Monoxide with Propene over Cu-Silico-aluminophosphate (SAPO) under Oxidizing Atmosphere", *The Chemical Society of Japan* (1992), 2119-2122.

Ishihara, Tatsumi et al., "Thermostable Molecular Sieves, Silicoaluminophosphate (SAPO)-34, for the Removal of NOx with C3H6 in the Coexistence of O2, H2O, and SO2", *Ind. Eng. Chem. Res.*, 36 1997, 17-22.

Kwak, Ja H. et al., "Excellent activity and selectivity of Cu-SSZ-13 in the selective catalytic reduction of NOx with NH3", *Journal of Catalysis* 2010, 4 pgs.

Li, Yuejin et al., "Selective NH3 Oxidation to N2 in a Wet Stream", *Applied Catalysis B: Environmental 13* 1997, 131-139.

Lok, B. M. et al., "Silicoaluminophosphate Molecular Sieves: Another New Class of Microporous Crystalline Inorganic Solids", *Journal of the American Chemical Society*, vol. 106 1984, 6092-6093.

Marchese, L. et al., "ALPO-34 and SAPO-34 synthesized by using morpholine as templating agent. FTIR and FT-Raman studies of the host-guest and guest-guest interactions within the zeolitic framework", *Microporous and Mesoporous Materials 30* 1999, 145-153.

Medros, F. G. et al., "Dual-Catalyst System to Broaden the Window of Operability in the Reduction of NOx with Ammonia", *Ind. Eng. Chem. Res. 28* 1989, 1171-1177.

Miller, William R. et al., "Urea selective catalytic reduction", *2010 Factiva, Inc.* 2000, 9 pgs.

Misono, Makoto, "Catalytic reduction of nitrogen oxides by bifunctional catalysts", *Baltzer Science Publishers* vol. 2, No. 2 Dec. 1998, 24 pgs.

Palella, B. I. et al., "On the hydrothermal stability of CuAPSO-34 mircoporous catalysts for N2O decomposition: a comparison with CuZSM-5", *Journal of Catalysis 217* 2003, 100-106.

Prakash, A. M. et al., "Synthesis of SAPO-34: High Silicon Incorporation in the Presence of Morpholine as Template", *J. Chem. Soc. Faraday Trans. 90*(15) 1994, 2291-2296.

Rebrov, E. V. et al., "Development of the Kinetic Model of Platinum Catalyzed Ammonia Oxidation in a Microreactor", *Chemical Engineering Journal 90* 2002, 61-76.

Torre-Abreu, C. et al., "Selective Catalytic Reduction of NO on Copper-Exchanged Zeolites: The Role of the Structure of the Zeolite in the Nature of Copper-Active Sites", *Catalysis Today 54* 1999, 407-418.

Treacy, M.M. J. et al., "Proceedings of the 12th International Zeolite Conference", *Materials Research Society Conference Proceedings IV* Jul. 5-10, 1998, 6.

Uzunova, Ellie L. et al., "Adsorption of NO on Cu-SAPO-34 and Co-SAPO-34; A Periodic DFT Study", *J. Phys. Chem C 2008* 2008, 2632-2639.

Watanabe, Yoshihide et al., "Multinuclear NMR Studies on the Thermal Stability of SAPO-34", *Journal of Catalysis* 1993, 430-436 pgs.

Zelenka, P. et al., "Exhaust gas aftetreatment systems for diesel engines with respect to future emission legislation", *Diesel Engine Technology 96* May 1993, 13 pgs.

Non-Final Office Action in U.S. Appl. No. 12/612,142, mailed Dec. 29, 2010, 26 pgs.

Brandenberger, Sandro et al., "The State of the Art in Selective Catalytic Reduction of NOx by Ammonia Using Metal-Exchanged Zeolite Catalysts", *Catalysis Reviews 50:4* 2008, 41 pgs.

Cavataio, Giovanni et al., "Cu/Zeolite SCR on High Porosity Filters: Laboratory and Engine Performance Evaluations", *SAE International, Ford Motor Company* 2009, 10 pgs.

Cavataio, Giovanni et al., "Development of Emission Transfer Functions for Predicting the Deterioration of a Cu-Zeolite SCR Catalyst", *SAE International, Ford Motor Company* 2009, 1-17.

Cavataio, Giovanni et al., "Enhanced Durability of a Cu/Zeolite Based SCR Catalyst", *SAE Int. J. Fuels Lubr*, vol. 1, Issue 1 2008, 477-487.

Cavataio, Giovanni et al., "Laboratory Testing of Urea-SCR Formulations to Meet Tier 2 Bin 5 Emissions", *SAE International, 2007 World Congress* 2007, 16 pgs.

Centi, Gabriele et al., "Nature of active species in copper-based catalysts and their chemistry of transformation of nitrogen oxides", *Applied Catalysts A: General 132* 1995, 179-259.

Centi, G., "Review Paper on Zeolites in Corma Treatise", *Zeolites and Catalysts*, vol. 1, 51 pgs, (2010).

Chang, Russell et al., "Thermal durabiluty and deactivation of Cuzeolite SCR catalysts", *Johnson Matthey Inc.*, 1 pgs.

Cheng, Yisun et al., "Sulfur Tolerance and DeSOx Studies on Diesel SCR Catalysts", *SAE Int. J. Fuels Lubr.*, vol. 1, Issue 1 2008, 471-476.

Cheng, Yisun et al., "The Effects of SO2 and SO3 Poisoning on Cu/Zeolite SCR Catalysts", *SAE International* 2009, 7 pgs.

Fickel, Dustin W. et al., "Copper Coordination in Cu-SSZ-13 and Cu-SSZ-16 Investigated by Variable-Temperature XRD", *J. Phys. Chem C*, 114 2010, 1633-1640.

Fickel, Dustin W., "Investigating the High-Temperature Chemistry of Zeolites: Dehydrogenation of Zeolites and NH3-SCR of Copper Exchanged Small-Pore Zeolites", *Dissertation* 2010, 1-199.

Girard, James et al., "Influence of Hydrocarbon Storage on the Durabiluty of SCR Catalysts", *SAE International, 2008 World Congress* 2008, 10 pgs.

Kim, Moon H. et al., "Water Tolerance of DeNOx SCR Catalysts Using Hydrocarbons: Findings, Improvements and Challenges", *Korean J. Chem. Eng.* 18(5) 2001, 725-740.

Long, R. Q. et al., "Selective Catalytic Oxidation (SCO) of Ammonia to Nitrogen over Fe-Exchanged Zeolites", *Journal of Catalysis 201* 2001, 145-152.

Pelella, B. I. et al., "Enhancement of Hydrothermal Stability of Cu-ZSM5 Catalyst for NO Decomposition", *Kinetics and Catalysis*, vol. 47, No. 5 2006, 728-736.

Pluth, J. J. et al., "Positions of Cations and Molecules in Zeolites with the Chabazite Framework. IV Hydrated and Dehydrated Cu2+-Exchanged Chabazite", *Mat. Res. Bull.*, vol. 12 1977, 1001-1007.

Qi, Gongshin et al., "Selective Catalytic Reduction of Nitric Oxide with Ammonia over ZSM-5 Based Catalysts for Diesel Engine Applications", *Catal Lett 121* 2008, 111-117.

Rahkamaa-Tolonen, Katariina et al., "The effect of NO2 on the activity of fresh and aged zeolite catalysts in the NH3-SCR reaction", *Catalysts Today*, 100 2005, 217-222.

Xu, Lifeng et al., "Impact of a Cu-zeolite SCR Catalyst on the Performance of a Diesel LNT+SCR System", *SAE International* 2009, 12 pgs.

Non-Final Office Action in U.S. Appl. No. 12/361,980, mailed Mar. 23, 2011, 24 pgs.

Action Closing Prosecution in U.S. Appl. No. 95/001,453, mailed Nov. 18, 2011, 102 pgs.

Non-Final Office Action in U.S. Appl. No. 12/970,582, mailed Dec. 7, 2011, 25 pgs.

Halasz, J. et al., "Selective Reduction of NO Over Copper-Containing Modified Zeolites", *Studies in Surface Science and Catalysis*, vol. 96 1995, 675-685.

Heck, Ronald M. et al., "Catalytic Air Pollution Control—Commercial Technology", *Second Edition* 2002, 9 pgs.

Ishihara, Tatsumi et al., "Selective Reduction of Nitrogen Monoxide with Propene Over Cu-Silico-aluminophosphate (SAPO) Under Oxidizing Atmosphere", *Chemistry Letters, The Chemical Society of Japan* 1992, 2119-2122.

Final Office Action in U.S. Appl. No. 12/480,360, mailed Jul. 26, 2010, 11 pgs.

Database Compendex [Online] Engineering Information, Inc., New York, NY, US; Nov. 15, 1999, Dedecek J et al: Siting of the Cu<+> ions in dehydrated ion exchanged synthetic and natural chabasites: a Cu<.

Declaration by Gabriele Centi, PH.D, 48 pgs, Jan. 2012.

Declaration by Johannes A. Lercher, Ph.D., 13 pgs, Jan. 2012.

Declaration by Wolfgang Strehlau, PH.D., 18 pgs, Jan. 2012.

Third Party Comments After Patent Owner's Response After ACP Under 37 CFR 1.951, dated Jan. 18, 2012, 40 pgs.

Non-Final Office Action in U.S. Appl. No. 12/480,360, mailed Feb. 1, 2012, 20 pgs.

Centi, Gabriele et al., "Sustainable Industrial Processes", 81 pgs, 2009.

Dedecek, Jiri et al., "Effect of Framework Charge Density on Catalytic Activity of Copper Loaded molecular Sieves of Chabazite Structure in Nitrogen(II) Oxide Decomposition", *Molecular Sieves of Chabazite Structure* Feb. 23, 2000, 343-351.

Heck, Ronald M. et al., "Catalytic Air Pollution Control—Commercial Technology", *Second Edition* 2002, 9 pgs.

Korhonen, Satu T. et al., "Isolated Cu2+ ions: active sites for selective catalytic reduction of NO+", *ChemComm* Nov. 15, 2010, 3 pgs.

McEwen, Jean-Sabin et al., "Selective Catalytic Reduction of NOx by ammonia on metal-exchanged zeolite catalysts", *Prepr. Pap-Am. Chem. Soc., Div. Fuel Chem.*, 55 2011, 1 pg.

Action Closing Prosecution in U.S. Appl. No. 95/001,453, mailed May 11, 2012, 69 pgs.

Final Office Action in U.S. Appl. No. 12/970,582, dated Mar. 26, 2012, 13 pgs.

Final Office Action in U.S. Appl. No. 12/480,360, dated Jul. 18, 2012, 10 pgs.

* cited by examiner

PROCESS OF DIRECT COPPER EXCHANGE INTO NA+-FORM OF CHABAZITE MOLECULAR SIEVE, AND CATALYSTS, SYSTEMS AND METHODS

CROSS-REFERENCE TO RELATED APPLICATIONS

This application claims the benefit of priority under 35 U.S.C. §119(e) to U.S. Provisional Application Ser. No. 61/287,704, filed Dec. 18, 2009, the disclosure of which is hereby incorporated herein by reference thereto.

BACKGROUND

Embodiments of the present invention relate to a process for the preparation of copper containing molecular sieves with the CHA structure having a silica to alumina mole ratio greater than about 10, wherein the copper is exchanged into the $Na^+$-form of the Chabazite, using a liquid copper solution wherein the concentration of copper is in the range of about 0.001 to about 0.4 molar. In addition, this invention relates to copper containing molecular sieves with the CHA structure, obtainable or obtained by the above-described process, and catalysts, systems and methods.

Both synthetic and natural zeolites and their use in promoting certain reactions, including the selective catalytic reduction (SCR) of nitrogen oxides with a reductant like ammonia, urea and/or hydrocarbon in the presence of oxygen, are well known in the art. Zeolites are aluminosilicate crystalline materials having rather uniform pore sizes which, depending upon the type of zeolite and the type and amount of cations included in the zeolite lattice, range from about 3 to 10 Angstroms in diameter. Chabazite (CHA) is a small pore zeolite with 8 member-ring pore openings (~3.8 Angstroms) accessible through its 3-dimensional porosity (as defined by the International Zeolite Association). A cage like structure results from the connection of double six-ring building units by 4 rings.

X-ray diffraction studies on cation locations in Chabazite have identified seven cation sites coordinating with framework oxygens, labeled A, B, C, D, F, H, and I. They are located in the center of double six-membered ring, on or near the center of the six-membered ring in Chabazite cage, and around the eight-membered ring of the chabazite cage, respectively. The C site is located slightly above the six-membered ring in the Chabazite cage and the F, H and I sites are located around the eight-membered ring in the Chabazite cage (see Mortier, W. J. "Compilation of Extra Framework Sites in Zeolites", Butterworth Scientific Limited, 1982, p 11 and Pluth, J. J., Smith, J. V., Mortier, W. J., Mat. Res. Bull., 12 (1977) 1001).

The catalysts employed in the SCR process ideally should be able to retain good catalytic activity over the wide range of temperature conditions of use, for example, 200° C. to 600° C. or higher, under hydrothermal conditions. Hydrothermal conditions are often encountered in practice, such as during the regeneration of a soot filter, a component of the exhaust gas treatment system used for the removal of particles.

Metal-promoted zeolite catalysts including, among others, iron-promoted and copper-promoted zeolite catalysts, for the selective catalytic reduction of nitrogen oxides with ammonia are known. Iron-promoted zeolite beta (U.S. Pat. No. 4,961,917) has been an effective commercial catalyst for the selective reduction of nitrogen oxides with ammonia. Unfortunately, it has been found that under harsh hydrothermal conditions, for example exhibited during the regeneration of a soot filter with temperatures locally exceeding 700° C., the activity of many metal-promoted zeolites begins to decline. This decline is often attributed to dealumination of the zeolite and the consequent loss of metal-containing active centers within the zeolite.

The process of preparation of metal containing Chabazite as known in the art can be divided in four sub-steps i) crystallization of the organic template containing Na-Chabazite, ii) calcination of Na-Chabazite, iii) NH4-exchange to form NH4-Chabazite and iv) metal-exchange into to NH4-Chabazite to form metal-Chabazite. The NH4-exchange step aims to remove alkali metals (e.g. Na) which are detrimental to the hydrothermal stability of the final catalyst.

The typical Na2O level of Na-Chabazite is between 6000 and 8000 ppm. Sodium is known to degrade the zeolite structure under hydrothermal aging conditions via formation of Na4SiO4 and Na2Al2O4 and concomitant dealumination of the zeolite. In order to keep the Na2O content low, an NH4-exchange with for example NH4NO3 is carried out in a third step.

Dedecek et al. describes in Microporous and Mesoporous Materials 32 (1999) 63-74 a direct copper exchange into Na+-, Ca2+-, Cs+-, Ba2+-form of Chabazite. An aqueous solution of copper acetate is used with copper concentrations varying between 0.20 and 7.6 wt % that is between 0.001 and 0.1 molar. The liquid to solid ratio varies between 20 and 110. The silica to alumina ratio is between 5 and 8. In all direct exchanges (i.e. copper in to the Na-form of the zeolite) of the natural chabazite, the total alkali metal content of the copper containing molecular sieves with the CHA structure is greater than about 4.6 wt % (expressed as the metal oxide). Additionally, in the direct exchange of synthetic Na-Chabazite, the sodium content is greater than about 0.97 wt % Na2O when one exchange step is used, or about 0.73 wt % Na2O when 2 exchange steps are used.

WO 2008/77590 describes a process of direct metal exchange into Na+-form of a zeolite material, wherein the metal-exchange is done by suspending a zeolite material in an aqueous solution which comprises metal ions and ammonium ions. As specific non-limiting examples of metal ions, iron, silver, and copper are described. The use of ammonium double salt is used in specific embodiments. In the examples BEA was used as zeolite material and ammonium iron(II) sulfate hexahydrate as iron source having a concentration of about 0.025 and 0.09 molar. No catalytic data are disclosed.

The technical challenge of the direct copper exchange process is to replace the residual Na+ ions with Cu2+ ions and reach target loadings of both metals to simultaneously meet catalytic performance and stability needs of the SCR process. Both excess CuO and residual Na2O are assumed to have a detrimental effect on the catalyst performance after aging.

WO 2008/106519 discloses a catalyst comprising: a zeolite having the CHA crystal structure and a mole ratio of silica to alumina greater than 15 and an atomic ratio of copper to aluminum exceeding 0.25. The catalyst is prepared via copper exchanging NH4+-form CHA with copper sulfate or copper acetate. The copper concentration of the aqueous copper sulfate ion-exchange step varies from 0.025 to 1 molar, where multiple copper ion-exchange steps are needed to attain target copper loadings. The catalyst resulting from copper sulfate ion-exchange exhibits NOx conversion from 45 to 59% at 200° C. and ~82% at 450° C. Free copper must be added to improve the 200° C. performance after aging. 0.4 M copper acetate exchange results in a material with NOx conversion after aging of 70 and 88% at 200 and 450° C., respectively. In WO 2008/106519 a large excess of copper is used in order to reach a CuO loading of about 3 wt %; the typical Cu exchange yield using copper sulfate is only about 4%. For copper acetate, the Cu exchange yield is between 24 and 31%.

US 2008/0241060 and WO 2008/132452 disclose that zeolite material can be loaded with iron and/or copper, whereas iron and/or copper are introduced into the mircoporous crystalline material by aqueous or solid state ion-exchange or incorporated by a direct-synthesis (during zeolite synthesis), whereas a direct-synthesis does not require a metal doping process after the zeolite has been formed. In the examples of US 2008/0241060, NH4NO3 was used to remove residual sodium, but the copper ion-exchange is not described. Example 2 of WO 2008/132452 states that an ammonium exchange was carried out before an aqueous copper exchange using copper nitrate. It is stated that multiple aqueous ion-exchanges were carried out to target 3 wt % Cu. No details of reaction conditions were provided.

There is an on-going desire to simplify the process of preparing copper containing molecular sieves with the CHA structure as this process contains many processing steps adding capital and operating cost to the manufacturing process.

SUMMARY

In one or more embodiments an SCR catalyst based on molecular sieves provided herein exhibits comparable NOx conversion activity with the catalysts of the state of the art obtained via multi-step synthesis (copper exchange into NH4-Chabazite). In general, catalyst are provided that exhibit both good low temperature NOx conversion activity (NOx conversion>50% at 200° C.) and good high temperature NOx conversion activity (NOx conversion>70% at 450° C.). The NOx activity is measured under steady state conditions at maximum NH3-slip conditions in a gas mixture of 500 ppm NO, 500 ppm NH3, 10% O2, 5% H2O, balance N2 at a volume-based space velocity of 80,000 h−1.

One or more embodiments of the invention provide a novel time- and cost-saving process for the preparation of a Cu containing Chabazite. Other embodiments of the invention provide a process exhibiting high usage of copper. The high conversion rate also provides advantages in wastewater management beneficial for the environment.

Therefore, embodiments of the present invention relate to a process for the preparation of copper containing molecular sieves with the CHA structure having a silica to alumina ratio greater than about 10, wherein the copper is exchanged into the Na+-form of Chabazite, using a liquid copper solution wherein the concentration of copper is in the range of about 0.001 to about 0.4.

In specific embodiments, direct copper exchange circumvents the conventional NH4 ion exchange that is applied to Na-Chabazite in order to eliminate residual Na. Additionally, some Chabazite materials contain other alkali metal cations, which are detrimental to the catalyst stability, such as potassium. Sodium and potassium are often used in the Chabazite crystallization. The direct exchange can eliminate residual alkali metals.

In a one embodiment, a process for the preparation of copper containing molecular sieve with the CHA structure having a silica to alumina mole ratio greater than about 10, wherein the copper is exchanged into the Na+-form of the Chabazite, using a liquid copper solution wherein the concentration of copper is in the range of about 0.001 to about 0.4 molar. In one or more embodiments, the process is modified so that the liquid to solid ratio which is defined as the weight of water used to prepare the Cu solution relative to the weight of the starting zeolite used in the copper exchange step is in the range of about 2 to about 80. In one or more embodiments, the reaction temperature of the copper-exchange step is in the range of about 10 to about 100° C. According to one or more embodiments, copper acetate or an ammoniacal solution of copper ions is used as copper source. Any of the above embodiments can be modified so that the concentration of copper is in the range of about 0.075 to about 0.3 molar. Any of the above embodiments can be modified so that the molecular sieve has a sodium content of less than about 2500 ppm.

One embodiment pertains to copper containing molecular sieve with the CHA structure, made by the process of by any of the embodiments according to the first through sixth embodiments.

In one or more embodiments, the copper containing molecular sieve with the CHA structure shows at least two signals in a $H_2$ TPR spectra, wherein the maximum of signal I is in the range from about 25 to about 400° C. and the maximum of signal II is in the range from about 475° C. to about 800° C. In one or more embodiments, the copper containing molecular sieves with the CHA structure has a UV-VIS half-height-half-width wavelength in the range from about 15 to about 35 nm. One or more embodiments pertain to a copper containing molecular sieve of the eighth and ninth embodiments in which the molecular sieve has a weight ratio of exchanged copper to copper oxide of at least about 1. One or more embodiments include the feature that the copper containing molecular sieves with the CHA structure shows at least one peak in diffuse reflectance FT-IR spectroscopy method at about 1948 $cm^{-1}$.

In one or more embodiments a copper containing molecular sieve with the CHA structure is provided having a mole ratio of silica to alumina greater than 10 and a copper content, calculated as CuO, of at least 1.5 wt.-%, based on the total weight of the calcined zeolite, wherein the atomic ratio of copper to sodium is greater than 0.5 and up to 200 and the weight ratio of exchanged copper to copper oxide of at least about 1.

Embodiments of the invention pertain to a catalyst containing a copper containing molecular sieve with the CHA structure according to any of the above embodiments. In one embodiment, the molecular sieve with the CHA structure is zeolitic Chabazite with a silica to alumina mole ratio in the range of about 15 to about 40 and a copper to aluminum atomic ratio in the range of about 0.25 and about 0.50.

Other embodiments pertain to use of a catalyst containing a copper containing molecular sieves with the CHA structure as catalyst for the selective reduction of nitrogen oxides $NO_x$; for the oxidation of $NH_3$; for the decomposition of $N_2O$; for soot oxidation; for emission control in Advanced Emission Systems; as additive in fluid catalytic cracking processes; as catalyst in organic conversion reactions; or as catalyst in "stationary source" processes.

Another embodiment pertains to an exhaust gas treatment system comprising an exhaust gas stream containing ammonia and/or urea and at least a catalyst containing a copper containing a molecular sieve with the CHA structure.

An embodiment also pertains to a method of selectively reducing nitrogen oxides $NO_x$, wherein a gaseous stream containing nitrogen oxides $NO_x$, is contacted with the copper containing molecular sieves with the CHA structure of any of the above embodiments.

DETAILED DESCRIPTION

Figure 1:
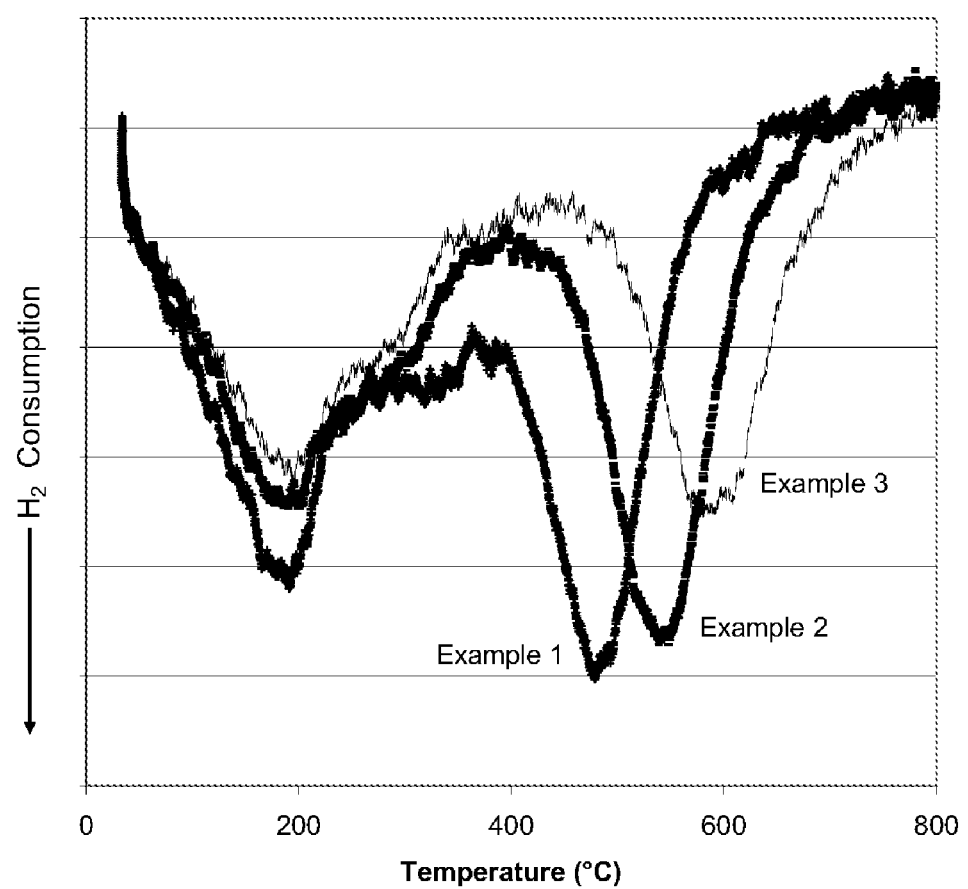
FIG. 1 is a H2 TPR plot for examples #2 through #4.

As used in this specification and the appended claims, the singular forms "a", "an" and "the" include plural referents unless the context clearly indicates otherwise. Thus, for example, reference to "a catalyst" includes a mixture of two or more catalysts, and the like.

As used in this specification and the appended claims, the term "Na+-form of Chabazite" refers to the calcined form of this zeolite without any ion exchange. In this form, the zeolite generally contains a mixture of Na+ and H+ cations in the exchange sites. The fraction of sites occupied by Na+ cations varies depending on the specific zeolite batch and recipe.

A molecular sieve can be zeolitic—zeolites—or non-zeolitic, and zeolitic and non-zeolitic molecular sieves can have the chabazite crystal structure, which is also referred to as the CHA structure by the International Zeolite Association. Zeolitic chabazite include a naturally occurring tectosilicate mineral of a zeolite group with approximate formula: (Ca, Na2,K2,Mg)Al2Si4O12×6H2O (e.g., hydrated calcium aluminum silicate). Three synthetic forms of zeolitic chabazite are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic chabazite, SSZ-13, is described in U.S. Pat. No. 4,544,538, which is hereby incorporated by reference. Synthesis of a synthetic form of a non-zeolitic molecular sieve having the chabazite cryptal structure, silicoaluminophosphate 34 (SAPO-34), is described in U.S. Pat. No. 7,264,789, which is hereby incorporated by reference. A method of making yet another synthetic no-zeolitic molecular sieve having chabazite structure, SAPO-44, is described in U.S. Pat. No. 6,162,415, which is hereby incorporated by reference.

Synthesis of the $Na^+$-zeolites having the CHA structure can be carried out according to various techniques in the art. For example, in a typical SSZ-13 synthesis, a source of silica, a source of alumina, and an organic directing agent are mixed under alkaline aqueous conditions. Typical silica sources include various types of fumed silica, precipitated silica, and colloidal silica, as well as silicon alkoxides. Typical alumina sources include boehmites, pseudo-boehmites, aluminum hydroxides, aluminum salts such as aluminum sulfate or sodium aluminate, and aluminum alkoxides. Sodium hydroxide is typically added to the reaction mixture. A typical directing agent for this synthesis is adamantyltrimethylammonium hydroxide, although other amines and/or quaternary ammonium salts may be substituted or added to the latter directing agent. The reaction mixture is heated in a pressure vessel with stirring to yield the crystalline SSZ-13 product. Typical reaction temperatures are in the range of 100 and 200° C., in specific embodiments between 135 and 170° C. Typical reaction times are between 1 hr and 30 days, in specific embodiments between 10 hours and 3 days.

At the conclusion of the reaction, optionally the pH is adjusted to between 6 and 10, in specific embodiments between 7 and 7.5, and the product is filtered and washed with water. Any acid can be used for pH adjustment, in specific embodiments nitric acid is used. Alternatively, the product may be centrifuged. Organic additives may be used to help with the handling and isolation of the solid product. Spray-drying is an optional step in the processing of the product. The solid product is thermally treated in air or nitrogen. Alternatively, each gas treatment can be applied in various sequences, or mixtures of gases can be applied. Typical calcination temperatures are in the 400° C. to 850° C. range.

CHA:

In specific embodiments the copper containing molecular sieves with the CHA structure includes all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236ZK-14, SAPO-34, SAPO-44, SAPO-47, ZYT-6, CuSAPO-34, CuSAPO-44, and CuSAPO-47. Most preferably the material will have the aluminosilicate composition, such as SSZ-13 and SSZ-62.

Concentration:

The copper concentration of the liquid copper solution used in the copper ion-exchange in specific embodiments is in the range from about 0.01 to about 0.35 molar, in more specific embodiments in the range from about 0.05 to about 0.3 molar, in even more specific embodiments in the range from about 0.075 to about 0.3 molar, in even more specific embodiments in the range from about 0.1 to about 0.3 molar, in even more specific embodiments in the range from about 0.1 to about 0.25 molar and in even more specific embodiments in the range from about 0.125 to about 0.25 molar.

Liquid:Solid-Ratio:

The liquid to solid ratio which is defined here as the weight of water and copper salt used to prepare the Cu solution relative to the dry weight of the starting zeolite used in the copper exchange step in specific embodiments is in the range from about 0.1 to about 800, in more specific embodiments in the range from about 2 to about 80, in even more specific embodiments in the range from about 2 to about 15, in even more specific embodiments in the range from about 2 to about 10, in even more specific embodiments in the range from about 4 to about 8.

Combination: Concentration-Liquid:Solid Ratio:

According to a preferred embodiment of embodiments of the present invention, the concentration of the copper solution used in the copper ion-exchange step is in specific embodiments in the range from 0.05 to about 0.3 and the liquid to solid ratio which is defined here as the weight of water and copper salt used to prepare the Cu solution relative to the weight of the starting zeolite is in the range from about 2 to about 10. In more specific embodiments the concentration of the copper solution used in the copper ion-exchange is in specific embodiments in the range from 0.1 to about 0.25 and the liquid to solid ratio is in the range from about 4 to about 8.

Reaction Temperature:

The reaction temperature of the copper-exchange step is in specific embodiments in the range of about 15 to about 100° C., in more specific embodiments in the range of about 20 to about 60° C. In the case where ammoniacal solutions of copper ions is used as copper source, the reaction temperature is in specific embodiments in the range of about 20 to about 35° C., in even more specific embodiments in the range of about 20 to about 25° C.

Addition Order of Reactants:

The reactants zeolite, copper source and water may be added in any order. In specific embodiments, the zeolite is added to a premade solution of copper salt or complex, which can be at room temperature or already preheated to the ion-exchange temperature. In even more specific embodiments the premade solution of copper salt or complex is heated to a temperature of about 20 to about 90° C., in even more specific embodiments of about 40 to about 75° C., in even more specific embodiments of about 55 to about 65° C. before adding the zeolite.

Reaction Time:

The reaction time of the ion-exchange step is in specific embodiments in the range of about 1 minute to about 24 hours, in more specific embodiments in the range of about 30 minutes to about 8 hours, in even more specific embodiments in the range of about 1 minute to about 10 hours, in even more specific embodiments from about 10 minutes to about 5 hours, in even more specific embodiments in the range of about 10 minutes to about 3 hours, in even more specific embodiments from about 30 minutes to about 1 hour.

Reaction Conditions:

The aqueous solution is in specific embodiments suitably stirred. In general, the stirring speed is decreased as the reactor size increases.

pH: Use of Acidic Additives:

In specific embodiments, the pH of the ion-exchange step is in the range of about 1 to about 6, in more specific embodiments in the range of about 2 to about 6, and in even more specific embodiments in the range of about 3 to about 5.5. In the case where an ammoniacal solution of copper ions is used as copper source the pH of the ion-exchange step is in the range of about 5 to about 14, in more specific embodiments in the range of about 6 to about 12, and in even more specific embodiments in the range of about 8 to about 11.

Depending on the starting materials employed, it may be necessary to adjust the pH of the aqueous solution so that the pH has above-described values. In specific embodiments, the pH is adjusted to above-described values using acetic acid or ammonia which may be added as aqueous solution.

Copper Species:

Generally, all sources of Cu salts can be employed. By way of example, copper (II) oxide, copper acetate, copper nitrate, copper chloride, copper fluoride, copper sulfate, copper carbonate, copper oxalate and ammoniacal solutions of copper ions, for example copper amine carbonate, may be mentioned. In specific embodiments, an aqueous solution of at least one Cu salt or oxide is employed. Preferred are copper oxide and Cu salts, e.g. copper acetate, copper fluoride, copper chloride and ammoniacal solutions of copper ions. In even more specific embodiments is the use of copper acetate and/or ammoniacal solutions of copper ions, for example copper amine carbonate. The use of a mixture of two or more suitable sources for Cu may be mentioned.

Ammoniacal Solutions of Copper Ions:

Panias et al. (Oryktos Ploutos (2000), 116, 47-56) report the speciation of divalent copper ions in aqueous ammoniacal solutions. Amino complexes of divalent copper $Cu(NH_3)_n^{2+}$ are in practice the predominant forms in which copper is encountered in mildly acidic to strongly alkaline ammoniacal solutions. The ion $Cu(NH_3)_4^{2+}$ is the most important ion of the $Cu^{2+}$-$NH_3$-$H_2O$ system. It shows a wide region of stability varying from mildly acidic solutions with a pH of 5 to strongly alkaline solutions with a pH of 14. The hydroxyl complexes of divalent copper are met with in the $Cu^{2+}$-$NH_3$-$H_2O$ system only in very strongly alkaline solutions with a pH greater than 12 and in dilute ammoniacal solutions with a total ammonia concentration less than 0.1M. In ammoniacal solutions copper is encountered in the form of free $Cu^{2+}$ ions only in highly acidic aqueous solutions.

Cu:Al in the Copper Slurry for the Copper-Exchange Step:

Using copper acetate, the molar ratio of Cu to Al in the copper slurry for the copper-exchange step is in specific embodiments in the range of about 0.25 to about 2, in more specific embodiments in the range from about 0.5 to 2, in even more specific embodiments in the range from about 0.5 to 1.5, in even more specific embodiments in the range from about 0.5 to about 1.2. Using ammoniacal solutions of copper ions, the ratio of Cu to Al is in specific embodiments in the range of about 0.001 to about 1, in more specific embodiments in the range from about 0.25 to about 0.8, in even more specific embodiments in the range from about 0.25 to about 0.6, in even more specific embodiments in the range from about 0.25 to about 0.5. The slurry is composed of a zeolite dispersed in a copper solution.

Yield:

Percentage yield is defined as the number of moles Cu in zeolite/number of moles of Cu in starting solution×100. In specific embodiments the yield of the copper exchange step is at least about 30%, in specific embodiments at least about 35%, in more specific embodiments at least about 40%, in even more specific embodiments at least about 60%, in even more specific embodiments at least about 80%, in even more specific embodiments at least about 90%, in even more specific embodiments at least about 95%.

Repeating Ion-Exchange:

The copper-exchange step may be repeated for 0 to 10 times, in specific embodiments 0 to 2 times. In more specific embodiments the copper exchange step is conducted once and not repeated.

Post-Treatment:

After the copper exchange step, the exchange slurry containing the inventive copper containing molecular sieves with the CHA structure is suitably separated from the mother liquor. Prior to separation, the temperature of the mother liquor may be suitably decreased to a desired value employing a suitable cooling rate.

This separation can be effected by all suitable methods known to the skilled person, for example, by decantation, filtration, ultrafiltration, diafiltration or centrifugation methods or, for example, spray drying and spray granulation methods.

The Chabazite molecular sieve may be washed at least once with a suitable washing agent. It is possible to use identical or different washing agents or mixtures of washing agents in the case of at least two of the washing steps.

Washing agents used may be, for example, water, alcohols, such as, for example, methanol, ethanol or propanol, or mixtures of two or more thereof. For example, mixtures of two or more alcohols, such as, for example, methanol and ethanol or methanol and propanol or ethanol and propanol or methanol and ethanol and propanol, or mixtures of water and at least one alcohol, such as, for example, water and methanol or water and ethanol or water and propanol or water and methanol and ethanol or water and methanol and propanol or water and ethanol and propanol or water and methanol and ethanol and propanol, may be mentioned as mixtures.

The washwater temperature of the washing step is in specific embodiments in the range of about 10 to about 100° C., in even more specific embodiments in the range from about 15 to about 60° C., in even more specific embodiments in the range from about 20 to about 35° C., in even more specific embodiments in the range from about 20 to about 25° C.

After separation and optionally washing, the copper containing molecular sieves with the CHA structure may be dried. The drying temperatures and duration of drying are known to persons skilled in the art. The drying temperature is in specific embodiments in the range of from room temperature to about 200° C. and the duration of drying is in specific embodiments in the range of from about 0.1 to about 48 h.

After separation, optionally washing and drying, the copper containing molecular sieves with the CHA structure may be calcined in at least one additional step.

The calcination of the Chabazite molecular sieve is in specific embodiments effected at a temperature in the range of up to about 750° C. According to one alternative, if the calcination is carried out under static conditions, such as, e.g., in a muffle furnace, temperatures of up to about 500 to about 850° C. are preferred. In more specific embodiments temperatures up to about 500 to about 800° C. are used, in even more specific embodiments up to about 500 to about 750° C. According to another alternative, if the calcination is carried out under dynamic conditions, such as, e.g., in a rotary calciner, temperatures of up to about 500 to about 750° C. are preferred.

The calcination can be carried out stepwise at successive temperatures. The term "stepwise at successive temperatures" as used in the context of embodiments of the present invention designates a calcination in which the zeolite to be calcined is heated to a certain temperature, kept at this temperature for a certain time and heated from this temperature to at least one further temperature and kept there in turn for a certain time. By way of example, a stepwise calcination is described in the international patent application having the application number PCT/EP2009/056036. PCT/EP2009/056036 is incorporated by reference.

The calcination can be effected in any suitable atmosphere, such as, for example, air, lean air depleted in oxygen, oxygen, nitrogen, water steam, synthetic air, carbon dioxide. The calcination is in specific embodiments effected under air. It is also conceivable that calcination is carried out in a dual mode, i.e. a mode comprising a first calcination in an oxygen-reduced or oxygen-free atmosphere, said mode comprising a second calcination in an oxygen-enriched or pure oxygen atmosphere.

According to a specific embodiment, a first calcination step is carried out in a atmosphere comprising about 5 to about 15% air and about 80 to about 95% nitrogen, whereas the second calcination step is carried out in a atmosphere comprising about 100% air.

Product-by-Process:

Embodiments of the present invention also relate to the copper containing molecular sieves with the CHA structure having the Chabazite crystal structure, obtainable or obtained by above-described process.

Product:

Embodiments of the present invention also relate to the copper containing molecular sieves with the CHA structure as such or obtained/obtainable by the above described process of embodiments of the present invention, having a mole ratio of silica to alumina greater than 10 and a copper content, calculated as CuO, of at least 1.5 wt.-%, reported on a volatile-free basis, wherein that copper containing molecular sieves with the CHA structure shows at least two signals in a H2 TPR spectra, whereas the maximum of signal I is in the range of 25 to 400° C. and the maximum of signal II is in the range from about 475° C. to about 800° C., measured after calcination of the zeolite at 500° C. in air for 30 min.

Signal I may correlate to two reactions i) $Cu2++\frac{1}{2} H2 = Cu++H+$ and ii) $CuO+H2=Cu+H2O$ and signal II may correlate to one reaction iii) $Cu++\frac{1}{2} H2=Cu+H+$, whereas the maximum of the signal II is in the range from about 475° C. to about 800° C.

In specific embodiments the maximum of signal II is in the range from about 480° C. to about 800° C., in even more specific embodiments in the range from about 490° C. to about 800° C., in even more specific embodiments in the range from about 550° C. to about 800° C.

The use of this technique for the evaluation of metal-containing zeolites has been demonstrated in the literature. For example, Yan and co-workers report on the properties of Cu-ZSM-5 in Journal of Catalysis, 161, 43-54 (1996).

Cu2+ Versus CuO:

In specific embodiments, the calcined copper containing molecular sieves with the CHA structure as such or obtained/obtainable by the above described process of embodiments of the present invention shows a weight ratio of exchanged copper to copper oxide of at least about 1, measured after calcination of the zeolite at 450° C. in air for 1 hour. In specific embodiments the weight ratio of exchanged copper to copper oxide is at least about 1.5. In even more specific embodiments the weight ratio of exchanged copper to copper oxide is at least about 2.

In specific embodiments the exchanged copper is located in the active sites named C and H site. Thus, the copper containing molecular sieves with the CHA structure in specific embodiments exhibits a peak at about 1948 cm−1 (site C) and optionally at about 1929 cm−1 (site H) measured by diffuse reflectance FT-IR spectroscopy method (DRIFT).

The use of FTIR technique has been demonstrated in the literature, for example Giamello et al., J. Catal. 136, 510-520 (1992).

Copper Containing Molecular Sieves with the Cha Structure UV-VIS

In specific embodiments the calcined copper containing molecular sieves with the CHA structure as such or obtained/obtainable by the above described process of embodiments of the present invention has a UV-VIS half-height-half-width wavelength in the range from about 5 to about 35 nm, in more specific embodiments in the range from about 10 to 30 nm, in even more specific embodiments in the range from about 15 to about 25 nm, measured after calcination of the zeolite at 450° C. in air for 1 hour.

The use of UV-VIS technique has been demonstrated in the literature, for example J. Catal. 220, 500-512 (2003).

Wt. % Copper:

The Cu content of the copper containing molecular sieves with the CHA structure as such or obtained/obtainable by the above described process of embodiments of the present invention, calculated as CuO, is in specific embodiments at least about 1.5 wt.-%, in even more specific embodiments at least about 2 wt.-% and in even more specific embodiments at least about 2.5 wt.-%, in each case reported on a volatile-free basis. In even more specific embodiments, the Cu content of the Chabazite molecular sieve, calculated as CuO, is in the range of up to about 5 wt.-%, in more specific embodiments of up to about 4 wt.-%, and in even more specific embodiments of up to about 3.5 wt.-%, in each case reported on a volatile-free basis reported on a volatile-free basis. Therefore, in specific embodiments, ranges of the Cu content of the Chabazite molecular sieve, calculated as CuO, are from about 2 to about 5 wt.-%, in more specific embodiments from about 2 to about 4 wt.-%, and in even more specific embodiments from about 2.5 to about 3.5 wt.-%, and in even more specific embodiments from about 2.75 to about 3.25 wt.-%, in each case reported on a volatile-free basis. All wt.-% values are reported on a volatile-free basis.

Free Copper:

In addition to the copper that is exchanged to increase the level of copper associated with the exchanged sites in the structure of the zeolite, non-exchanged copper in salt from may be present in the Chabazite molecular sieve, so called free copper. However, in specific embodiments no free copper is present in the Chabazite molecular sieve.

Silica/Alumina:

In specific embodiments the copper containing molecular sieves with the CHA structure as such or obtained/obtainable by the above described process of embodiments of the present invention has a mole ratio of silica to alumina greater than about 15, in even more specific embodiments greater than about 20. In specific embodiments the copper containing Chabazite has a mole ratio of silica to alumina in the range from about 20 to about 256, in more specific embodiments in the range from about 25 to about 40.

Cu/Al:

In specific embodiments the atomic ratio of copper to aluminum of the copper containing molecular sieves with the CHA structure as such or obtained/obtainable by the above described process of embodiments of the present invention exceeds about 0.25. In more specific embodiments the atomic ratio of copper to aluminum is from about 0.25 to about 1, in even more specific embodiments from about 0.25 to about 0.5. In even more specific embodiments the atomic ratio of copper to aluminum is from about 0.3 to about 0.4.

SCR Activity:

In specific embodiments the copper containing molecular sieves with the CHA structure as such or obtained/obtainable by the above described process of embodiments of the present invention exhibits an aged NOx conversion at 200° C. of at least 50% measured at a gas hourly volume based space velocity of 80000 h−1 under steady state conditions at maximum NH3-slip conditions in a gas mixture of 500 ppm NO, 500 ppm NH3, 10% O2, 5% H2O, balance N2. In specific embodiments the copper containing molecular sieves with the CHA structure exhibits an aged NOx conversion at 450° C. of at least 70% measured at a gas hourly space velocity of 80000 h−1. In more specific embodiments the aged NOx conversion at 200° C. is at least 55% and at 450° C. at least 75%, in even more specific embodiments the aged NOx conversion at 200° C. is at least 60% and at 450° C. at least 80%, measured at a gas hourly space velocity of 80000 h−1. Typical conditions for this hydrothermal aging are: the copper containing catalyst is placed in a tube furnace in a gas flow containing 10% H2O, 10% O2, balance N2 at a volume-based space velocity of 8,000 to 12,500 h−1 for 1 to 24 hrs at 750° C. or 1 to 6 hrs at 850° C.

The SCR activity measurement has been demonstrated in the literature, for example WO 2008/106519.

Sodium Content:

In specific embodiments the copper containing molecular sieves with the CHA structure as such or obtained/obtainable by the above described process of embodiments of the present invention has a sodium content (reported as Na2O on a volatile-free basis) of below 2 wt.-%, reported on a volatile-free basis. In more specific embodiments sodium content is below 1 wt.-%, in even more specific embodiments below 2500 ppm, still in even more specific embodiments below 2000 ppm, in even more specific embodiments below 1000 ppm, in even more specific embodiments below 500 ppm and most preferred below 100 ppm.

Na:Al:

In specific embodiments the copper containing molecular sieves with the CHA structure as such or obtained/obtainable by the above described process of embodiments of the present invention has an atomic sodium to aluminum ratio of less than 0.7. In more specific embodiments the atomic sodium to aluminum ratio is less than 0.35, in even more specific embodiments less than 0.007, in even more specific embodiments less than 0.03 and in even more specific embodiments less than 0.02.

Na:Cu:

In specific embodiments the copper containing molecular sieves with the CHA structure as such or obtained/obtainable by the above described process of embodiments of the present invention has an atomic copper to sodium ratio of greater than 0.5. In more specific embodiments the atomic copper to sodium ratio of greater than 1, in even more specific embodiments greater than 10, in even more specific embodiments greater than 50.

High Na Chabazite:

Embodiments of the invention also relate to a copper containing molecular sieves with the CHA structure as such or obtained/obtainable by any of the above described processes. In one or more embodiments, the copper containing molecular sieves have a mole ratio of silica to alumina greater than 10 and a copper content, calculated as CuO, of at least 1.5 wt.-%, reported on a volatile-free basis, wherein the atomic ratio of copper to sodium is greater than 0.5 and up to 200 and the ratio of exchanged copper to copper oxide of at least about 1.

Additional Metal:

The copper containing molecular sieves with the CHA structure as such or obtained/obtainable by the above described process of embodiments of the present invention may contain one or more transition metals. In specific embodiments the Chabazite molecular sieve may contain transition metals capable of oxidizing NO to NO2 and/or storing NH3. The transition metal is in specific embodiments selected from the group consisting of Fe, Co, Ni, Zn, Y, Ce, Zr and V. Generally, all suitable sources for Fe, Co, Ni, Zn, Y, Ce, Zr and V can be employed. By way of example, nitrate, oxalate, sulphate, acetate, carbonate, hydroxide, acetylacetonate, oxide, hydrate, and/or salts such as chloride, bromide, iodide may be mentioned.

In addition, the copper containing molecular sieves with the CHA structure may contain one or more lanthanides. A preferred lanthanide source is, among others, lanthanum nitrate.

In addition, the copper containing molecular sieves with the CHA structure may contain one or more precious metals (e.g. Pd, Pt).

BET:

In specific embodiments, the calcined copper containing molecular sieves with the CHA structure as such or obtained/obtainable by the above described process of embodiments of the present invention exhibits a BET surface area, determined according to DIN 66131, of at least about 400 m2/g, in even more specific embodiments of at least about 550 m2/g, in even more specific embodiments of at about 650 m2/g. In specific embodiments, the Chabazite molecular sieve exhibits a BET surface area in the range from about 400 to about 750 m2/g, in more specific embodiments from about 500 to about 750 m2/g, in even more specific embodiments from about 600 to 750 m2/g.

Mean Length of Crystallites:

In specific embodiments, the crystallites of the calcined copper containing molecular sieves with the CHA structure as such or obtained/obtainable by the above described process of embodiments of the present invention have a mean length in the range of from 10 nanometers to 100 micrometers, in specific embodiments in the range of from 50 nanometers to 5 micrometers, in more specific embodiments in the range of 50 nanometers to 500 nanometers as determined via SEM.

TOC:

In specific embodiments, the calcined copper containing molecular sieves with the CHA structure as such or obtained/obtainable by the above described process of embodiments of the present invention has a TOC (total organic carbon) content of 0.1 wt.-% or less, based on the total weight of the Chabazite molecular sieve.

Thermal Stability:

In specific embodiments, the calcined copper containing molecular sieves with the CHA structure as such or obtained/obtainable by the above described process of embodiments of the present invention has a thermal stability, determined via differential thermal analysis or differential scanning calorimetry, in the range of from about 900 to about 1400° C., in specific embodiments in the range of from about 1100 to about 1400° C., in more specific embodiments in the range of from about 1150 to about 1400° C. For example, the measurement of thermal stability is described in PCT/EP2009/056036 at page 38.

Shape:

The Chabazite molecular sieve according to embodiments of the present invention may be provided in the form of a powder or a sprayed material obtained from above-described separation techniques, e.g. decantation, filtration, centrifugation, or spraying.

In general, the powder or sprayed material can be shaped without any other compounds, e.g. by suitable compacting, to obtain moldings of a desired geometry, e.g. tablets, cylinders, spheres, or the like.

By way of example, the powder or sprayed material is admixed with or coated by suitable modifiers well known in the art. By way of example, modifiers such as silica, alumina, zeolites and/or refractory binders (for example a zirconium precursor) may be used. The powder or the sprayed material, optionally after admixing or coating by suitable modifiers, may be formed into a slurry, for example with water, which is deposited upon a suitable refractory carrier (for example WO 2008/106519).

The Chabazite molecular sieve of embodiments of the present invention may also be provided in the form of extrudates, pellets, tablets or particles of any other suitable shape, for use as a packed bed of particulate catalyst, or as shaped pieces such as plates, saddles, tubes, or the like.

Catalyst:

Thus, embodiments of the present invention relate to a catalyst containing a copper containing molecular sieves with the CHA structure, obtainable or obtained by above-described process, disposed on a substrate.

The substrate may be any of those materials typically used for preparing catalysts, and will usually comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The substrate can also be a wall-flow filter substrate, where the channels are alternately blocked, allowing a gaseous stream entering the channels from one direction (inlet direction), to flow through the channel walls and exit from the channels from the other direction (outlet direction). In addition, suitable carriers/substrates as well as suitable coating processes are described in the international patent application having the application number PCT/EP2009/056036 and in WO 2008/106519. PCT/EP2009/056036 and WO 2008/106519 are incorporated by reference.

SCR/Exhaust Gas Treatment System:

In general, the copper containing molecular sieves with the CHA structure described above can be used as molecular sieve, adsorbent, catalyst, catalyst support or binder thereof. Especially preferred is the use as catalyst.

Moreover, embodiments of the present invention relate to a method of catalyzing a chemical reaction wherein the copper containing molecular sieves with the CHA structure according to embodiments of the present invention is employed as catalytically active material.

Among others, said catalyst may be employed as catalyst for the selective reduction (SCR) of nitrogen oxides (NOx); for the oxidation of NH3, in particular for the oxidation of NH3 slip in diesel systems; for the decomposition of N2O; for soot oxidation; for emission control in Advanced Emission Systems such as Homogeneous Charge Compression Ignition (HCCI) engines; as additive in fluid catalytic cracking (FCC) processes; as catalyst in organic conversion reactions; or as catalyst in "stationary source" processes. For applications in oxidation reactions, in specific embodiments an additional precious metal component is added to the copper chabazite (e.g. Pd, Pt).

Therefore, embodiments of the present invention also relate to a method for selectively reducing nitrogen oxides (NOx) by contacting a stream containing NOx with a catalyst containing the copper containing molecular sieves with the CHA structure according to embodiments of the present invention under suitable reducing conditions; to a method of oxidizing NH3, in particular of oxidizing NH3 slip in diesel systems, by contacting a stream containing NH3 with a catalyst containing the copper containing molecular sieves with the CHA structure according to embodiments of the present invention under suitable oxidizing conditions; to a method of decomposing of N2O by contacting a stream containing N2O with a catalyst containing the copper containing molecular sieves with the CHA structure according to embodiments of the present invention under suitable decomposition conditions; to a method of controlling emissions in Advanced Emission Systems such as Homogeneous Charge Compression Ignition (HCCI) engines by contacting an emission stream with a catalyst containing the copper containing molecular sieves with the CHA structure according to embodiments of the present invention under suitable conditions; to a fluid catalytic cracking FCC process wherein the copper containing molecular sieves with the CHA structure according to embodiments of the present invention is employed as additive; to a method of converting an organic compound by contacting said compound with a catalyst containing the copper containing molecular sieves with the CHA structure according to embodiments of the present invention under suitable conversion conditions; to a "stationary source" process wherein a catalyst is employed containing the copper containing molecular sieves with the CHA structure according to embodiments of the present invention.

In particular, the selective reduction of nitrogen oxides wherein the Chabazite molecular sieve according to embodiments of the present invention is employed as catalytically active material is carried out in the presence of ammonia or urea. While ammonia is the reducing agent of choice for stationary power plants, urea is the reducing agent of choice for mobile SCR systems. Typically, the SCR system is integrated in the exhaust gas treatment system of a vehicle and, also typically, contains the following main components: SCR catalyst containing the Chabazite molecular sieve according to embodiments of the present invention; a urea storage tank; a urea pump; a urea dosing system; a urea injector/nozzle; and a respective control unit.

Method of Reducing NOx:

Therefore, embodiments of the present invention also relate to a method for selectively reducing nitrogen oxides (NOx), wherein a gaseous stream containing nitrogen oxides (NOx), for example exhaust gas formed in an industrial process or operation, in specific embodiments also containing ammonia and/or urea, is contacted with the Chabazite molecular sieve according to embodiments of the present invention.

The term nitrogen oxides, NOx, as used in the context of embodiments of the present invention designates the oxides of nitrogen, especially dinitrogen oxide (N2O), nitrogen monoxide (NO), dinitrogen trioxide (N2O3), nitrogen dioxide (NO2), dinitrogen tetroxide (N2O4), dinitrogen pentoxide (N2O5), nitrogen peroxide (NO3).

The nitrogen oxides which are reduced using a catalyst containing the Chabazite molecular sieve according to embodiments of the present invention or the Chabazite molecular sieve obtainable or obtained according to embodiments of the present invention may be obtained by any process, e.g. as a waste gas stream. Among others, waste gas streams as obtained in processes for producing adipic acid, nitric acid, hydroxylamine derivatives, caprolactame, glyoxal, methyl-glyoxal, glyoxylic acid or in processes for burning nitrogeneous materials may be mentioned.

Especially preferred is the use of a catalyst containing the Chabazite molecular sieve according to embodiments of the present invention or the Chabazite molecular sieve obtainable or obtained according to embodiments of the present invention for removal of nitrogen oxides (NOx) from exhaust gases of internal combustion engines, in particular diesel engines, which operate at combustion conditions with air in excess of that required for stoichiometric combustion, i.e., lean.

Therefore, embodiments of the present invention also relate to a method for removing nitrogen oxides (NOx) from exhaust gases of internal combustion engines, in particular diesel engines, which operate at combustion conditions with air in excess of that required for stoichiometric combustion, i.e., at lean conditions, wherein a catalyst containing the Chabazite molecular sieve according to embodiments of the present invention or the Chabazite molecular sieve obtainable or obtained according to embodiments of the present invention is employed as catalytically active material.

Exhaust Gas Treatment System:

Embodiments of the present invention relate to an exhaust gas treatment system comprising an exhaust gas stream optionally containing a reductant like ammonia, urea and/or hydrocarbon, in specific embodiments ammonia or urea, and a catalyst containing a copper containing molecular sieves with the CHA structure, obtainable or obtained by above-described process, disposed on a substrate, a soot filter and a diesel oxidation catalyst.

The catalyzed or non catalyzed soot filter may be upstream or downstream of said catalyst. The diesel oxidation catalyst is in specific embodiments upstream of said catalyst. In specific embodiments said diesel oxidation catalyst and said catalyzed soot filter are upstream from said catalyst.

In specific embodiments, the exhaust is conveyed from the diesel engine to a position downstream in the exhaust system, in specific embodiments containing NOx, where a reductant is added and the exhaust stream with the added reductant is conveyed to said catalyst.

For example, a catalyzed soot filter, a diesel oxidation catalyst and a reductant are described in WO 2008/106519 which is incorporated by reference.

The following examples shall further illustrate the process and the materials of embodiments of the present invention.

EXAMPLES

H2-TPR Spectra

The H2 Temperature Programmed Reduction (TPR) measurements were carried out on a Micromeritics Autochem 2910 Analyzer with TCD detector. Pretreatment was done in 4% O2/He from room temperature to 500° C. at 20° C./min and a hold time of 20 minutes. The sample was then cooled to room temperature. This was followed by a purge in helium for 10 minutes. The TPR was carried out in 0.5% H2/N2 from room temperature to 900° C. at 10° C./min and hold time of 20 minutes. A Liquid Argon cold trap was used during reduction.

UV-VIS

The samples were hand ground using a mortar and pestle prior to sample packing into 0.2 cm quartz cuvette. Diffuse reflectance UV-vis spectra expressed by F(R) were collected using a diffuse reflectance attachment with an integrating sphere coated with BaSO4 inside a Cary 300 UV-Vis spectrometer. The following instrument parameter settings were utilized:

Scan rate=300 nm
SBW (resolution) 2.0 nm
Beam mode=double reverse
UV-Vis change over =350 nm
Baseline correction mode
Signal to noise correction mode Comparative Examples Comparative Example 1

Example 1 from WO 2008/106519 describes the multistep synthesis of CuSSZ-13 by two 1 M copper sulfate exchanges in to the NH4 form of SSZ-13. The pH was adjusted to 7.5 by addition of nitric acid to enable improved filtration. Details of important synthesis conditions and material properties are found in Tables 1 and 2.

2. Comparative Example 2

Example 18 from WO 2008/106519 describes the multi-step synthesis of CuSSZ-13 by 0.4 M copper acetate exchange in to the NH4 form of SSZ-13. Details of important synthesis conditions and material properties are found in Tables 1 and 2.

3. Comparative Example 3

Comparative example 2 was also carried out using the same batch of Na-SSZ-13 described below in example 1B (32 SiO2:Al2O3, and 0.71 wt % of Na2O on a volatile-free basis) which was used for all other inventive examples. First an ammonium exchange was carried out to remove the sodium before repeating the 0.4 M copper acetate exchange described in Example 18 from WO 2008/106519. The final composition was 3.58 wt % CuO, less than 100 ppm Na2O and 32.6 SiO2:Al2O3. Details of important synthesis conditions and material properties are found in Table 1.

4. Comparative Example 4

Example 19 from WO 2008/106519 was also carried out using the same batch of Na-SSZ-13 described below in example 1B (32 SiO2:Al2O3, and 0.71 wt % of Na2O on a volatile-free basis) which was used for all other inventive examples. First an ammonium exchange was carried out before repeating the 0.3 M copper acetate exchange described in Example 18 from WO 2008/106519. The final composition was 3.31 wt % CuO, less than 100 ppm Na2O and 32.6 SiO2:Al2O3. Details of synthesis conditions and material properties are found in Table 1.

Inventive Examples

Example 1

Starting Material Na-SSZ13

Example 1A

Starting Material Na-SSZ13 (1)

SSZ-13 was crystallized as described in U.S. Pat. No. 4,544,538 using trimethyladamantyl ammonium hydroxide as the template and sodium hydroxide as further source of OH. The pH was adjusted to 7.5, the material was recovered by filtration and dried before calcining at 600° C. to produce the Na-form of SSZ-13.

Chemical analysis showed the material to have 31.8 SiO2:Al2O3, and 0.62 wt % of Na2O on a volatile-free basis. XRD indicated that pure SSZ-13 had been obtained. The BET surface of the calcined material, determined according to DIN 66131, was 663 m2/g.

Example 1B

Starting Material Na-SSZ13 (2)

SSZ-13 was synthesized as described in example 1A. Chemical analysis showed the material to have 32.3 SiO2:Al2O3, and 0.71 wt % of Na2O on a volatile-free basis. XRD indicated that pure SSZ-13 had been obtained. The BET surface of the calcined material, determined according to DIN 66131, was 613 m2/g. The water content of the powder was ~4.8 wt %.

2. Direct Copper Acetate Exchange of Na-Form 2.1.1 Reagents and Suspension Preparation Examples 2-6

The following starting materials were employed:
Copper Acetate Monohydrate
Deionized water
Sodium Chabazite from example 1A 2.1.2 Ion-Exchange Conditions and Chemical Analysis Examples #2-#5

Table 1 lists the important synthesis parameters for the ion-exchange for examples 2 to 5. Typically, 200 g of the Na-CHA (example 1A), were immersed into 800 ml of the respective copper acetate solution at room temperature (r.t.) and stirred in a jacketed 1 L glass reactor. The volume of the exchange slurry was kept constant at a liquid:solid ratio of 4:1 which is defined above. An exception was example 5, where Cu:Al was adjusted by reducing the solid amount added to 125 g (5.33 liquid:solid). After 30 min, the temperature of the water jacket was ramped to 60° C. using a circulating heating bath. The temperature inside the exchange vessel was measured independently with a thermometer and is typically 57-58° C. The exchange slurry was kept for 3 hours at this temperature, and then filtered hot (without additional cooling) over a 33 cm diameter Buechner funnel using 541 Whatmann filterpaper (>25 μm filtration). The filtrate was collected and its pH measured after cool down to room temperature. The filtercake was then washed with batches of 1 L deionized water until the conductivity of the washwater reached 200 μScm−1. All filtercake samples were washed with room temperature washwater.

The CuO, Na2O, and Al2O3 content of the Cu-CHA filtercake samples were analyzed by ICP analysis. The SiO2 content was calculated from the difference. All values are reported on a volatile-free basis. Table 1 also summarizes the CuO and Na2O loading.

2.2.1 Reagents and Suspension Preparation

Example 6

The following starting materials were employed:
Copper Acetate Monohydrate
Deionized water
Sodium Chabazite from example 1B 2.2.2 Ion-Exchange Conditions and Chemical Analysis Example 6

Table1 also lists the important synthesis parameters for the ion-exchange in the preparation of example 6. A copper acetate solution was prepared by dissolving 57.5 g copper acetate monohydrate in 2822.5 g deionized water in a jacketed 4 Liter glass reactor. This solution was heated to 60° C. before addition of 360 g of the Na-CHA (example 1B). 150 g of deionized water was used to wash the reactor walls to insure all zeolite was in solution. The volume of the exchange slurry was kept constant at a liquid:solid ratio of 8:1. The temperature of 60° C. was maintained for 8 hours during which the pH ranged from 4.75 to 4.5. After 8 hours of ion-exchange the slurry was filtered hot over a 33 cm diameter Buechner funnel using 541 Whatmann filter paper (>25 μm filtration). The filtercake was then washed with deionized water until the conductivity of the washwater reached 200 μScm−1. The sample was washed with room temperature washwater. The resulting powder was then dried in an oven at 120° C. for 16 hours.

The CuO, Na2O, SiO2 and Al2O3 content of the Cu-CHA filtercake samples were analyzed by ICP analysis. All values are reported on a volatile-free basis. Table 1 also summarizes the CuO and Na2O loading. It had a water content of ~15.8 wt %.

TABLE 1

Copper acetate exchange conditions, yield and chemical analysis for direct exchange of NaCHA. Additionally details of comparative examples from multistep exchange of NH4CHA.

| Example | 2 | 3 | 4 | 5 | 6 |
|---|---|---|---|---|---|
| Copper exchange steps | 1 | 1 | 1 | 1 | 1 |
| Copper Concentration (mol/l) | 0.3 | 0.2 | 0.125 | 0.125 | 0.1 |
| Cu:Al (molar ratio) | 1.2 | 0.8 | 0.5 | 0.8 | 0.86 |

TABLE 1-continued

Copper acetate exchange conditions, yield and chemical analysis for direct exchange of NaCHA. Additionally details of comparative examples from multistep exchange of NH4CHA.

| CuO in zeolite (wt %) | 3.66 | 2.79 | 2.33 | 2.92 | 3.57 |
| Na$_2$O in zeolite (ppm) | 54 | 287 | 816 | 136 | 321 |
| Cu yield (%) | 40 | 45 | 60 | 46 | 56 |

| Example | Comp. 1 | Comp. 2 | Comp. 3 | Comp. 4 | Comp. 2 |
|---|---|---|---|---|---|
| Copper exchange steps | 2 | 1 | 1 | 1 | 1 |
| Copper Concentration (mol/l) | 1* | 0.4 | 0.4 | 0.3 | 0.4 |
| Cu:Al (molar ratio) | 4* | 1.6 | 1.73 | 1.3 | 1.6 |
| CuO in zeolite (wt %) | 2.41 | 3.06 | 3.58 | 3.31 | 3.06 |
| Na$_2$O in zeolite (ppm) | <100 | <100 | <100 | <100 | <100 |
| Cu yield (%) | 3.8 | 24 | 28 | 35 | 24 |

*2 exchanges were carried out using these conditions. Yield is calculated for Cu after 2 exchanges.

3 Catalyst Preparation, Aging at Testing on Core-Reactor

3.1 Coating of Catalyst

Catalyst Examples #2-#5

For the preparation of coated monolithic test scores, the filtercake produced as described as examples 2 to 5 (water content of 45% measured after calcination at 600° C. in air for 1 hour) was made into a slurry of 38-45% solid content by adding deionized water. The Cu-CHA slurry was then milled in a ceramic ball mill to a particle size of D90 of less than 10 μm (for example 4 to 10 μm) measured with a Sympatec particle size analyzer using forward Laser scattering. No acid or binder were added to the slurry in order to probe the intrinsic activity of the catalyst. The milled slurry was coated onto a ceramic monolith (NGK) of 1" diameter and 2" length having 400 cpsi cell density and 6 mil wall thickness. The target dry gain was 2.3 g/in3 which corresponds to the loading of active catalyst in WO 2008/106519. Typically two to three coats were needed to reach that target, the solid content of the additional coats has been adjusted to meet the desired target dry gain increase. After each coat the core was dried for 3 h at 90° C. in air. The last drying step was followed by a calcination for 1 h at 450° C. in air in a muffle funnel.

3.2 Aging and Catalytic Testing

Catalyst Examples #2-#5

The cores were hydrothermally aged in a tube furnace in a gas flow containing 10% H2O, 10% O2, balance N2 at a space velocity of 8,000 h−1 for 6 h at 850° C. This aging protocol has been chosen for the quality control test of Cu-CHA SCR catalysts.

The DeNOx activity was measured under steady state conditions at maximum NH3-slip conditions on a laboratory reactor in a gas mixture of 500 ppm NO, 500 ppm NH3, 10% O2, 5% H2O, balance N2 at a volume based space velocity of 80,000 h−1 at 200° C., 250° C., 300° C., and 450° C. Since activity is usually above 90% at 250° C. and 300° C., only the low temperature at 200° C. and high temperature NOx conversion at 450° C. will be discussed.

Table 2 contains the DeNOx activity after aging at 200 and 450° C. from the core-based catalytic test reactor described in this section.

TABLE 2

DeNOx activity of coated catalyst at 200 and 450° C. after hydrothermal aging.

| | Example | | | | | |
|---|---|---|---|---|---|---|
| | Catalyst 2 | Catalyst 3 | Catalyst 4 | Catalyst 5 | Catalyst comp 1 | Catalyst comp 2 |
| Aged 200° C. NOx conversion (%) | 61 | 55 | 53 | 63 | 45 | 70 |
| Aged 450° C. NOx conversion (%) | 68 | 77 | 81 | 83 | 82 | 88 |

4 Catalyst Preparation, Aging at Testing on Extrudate-Reactor

4.1 Preparation of Catalyst

Catalyst Example #6, Comparative Examples #3 and #4

The powders obtained from comparative examples 3 and 4 and example 6, were first prepared as an extrudate before testing. A typical preparation would involve adding 18 g of water to 20 g of dried powder in a Stephan-Werke GmbH mixer (Model No.: OZDe042/4s) at a mixing rate of 80 revolutions per minute. This was mixed until homogenous which took about 10 minutes. Then 0.5 g of polyethyleneoxide (PEO) were added and mixed until homogeneous which took 2 minutes. 2.5 wt % PEO was added to mixture as a binder. Then 2 g of water were added slowly and the paste was mixed for about 5 minutes to homogenize. This paste was then pressed in a hand-made press with an extruding hole of 2 mm diameter and 10 cm length. The resulting extrudates were dried at 120° C. for 5 hours and calcined at 540° C. for 5 hours. The extrudate was then sized into pellets and sieved to separate a pellet size of 0.5 to 1 mm. This size fraction was used for testing in the reactor. The sieves used were obtained from the company Retsch (500 μm sieve (S/N 04025277) and a 1 mm sieve (S/N 04009529) both having a diameter of 200 mm and height of 25 mm) The resulting catalyst retains the example name of its powder form i.e. catalyst example 6 was produced from example 6.

4.2 Aging and Catalytic Testing

Catalyst Example #6, Comparative Examples #3 and #4

The aging reactor was composed of a 1 mm thick steel tube (grade 1.4841 from Buhlmann Group) with diameters of 500 mm height and 18 mm internal diameter. A nickel mantle based furnace was used to heat the reactor to the target reaction temperature which was monitored by an internal thermocouple at the location of the sample. The steam was prepared by heating controlled amounts of water at 150° C. through a steel presteamer before mixing with the remaining gases in a static mixer. The gases together with the steam were then passed through a preheater to enable the target temperature.

The extrudates formed as described in section 4.1 were hydrothermally aged in a tube furnace in a gas flow containing 10% H2O, 10% O2, balance N2 at a space velocity of 12,500 h−1 for 6 hours at 850° C. These catalysts are now described as being in the aged state. The resulting catalyst retains the example name of its powder form i.e. catalyst example 3 was produced from example 3.

The aged catalysts samples were evaluated for selective catalytic reduction of NOx activity using the following reactor set up:

The reactor was composed of a 1 mm thick steel tube (grade 1.4541 from Buhlmann Group) with diameters of 500 mm height and 18 mm internal diameter. A copper mantle based furnace was used to heat the reactor to the target reaction temperature which was monitored by an internal thermocouple at the location of the sample.

5 ml (~1.8 g) of sample was loaded into the reactor and secured with a plug of silica wool at each end of the sample. The sample height was controlled by filling the empty reactor volume with an inert silica based material (Ceramtek AG—product #1.080001.01.00.00; 0.5 to 1 mm-45 g at the bottom and 108 g at the top of the sample).

An inlet gas mixture was formed containing 500 ppm NO, 500 ppm NH3, 10% O2, 5% steam and balance He. The steam was prepared by heating controlled amounts of water at 150° C. through a steel presteamer (grade 1.4541 from Buhlmann, dimensions were 6 mm internal diameter and 900 mm length) before mixing with the remaining gases in a static mixer. This gas mixture was then passed through a preheater set at 250° C. and static mixer before entering the SCR reactor described in the previous paragraph.

The DeNOx activity was measured under steady state conditions by measuring the NOx, NH3 and N2O concentrations at the outlet using a FTIR spectrometer. Samples were tested at reaction temperatures of 200 and 450° C. Furthermore, they were tested at a volume-based gas hourly space velocity of 80,000 h−1. NO conversion was then calculated as ((NO inlet concentration (ppm)−NO outlet concentration (ppm))/NO inlet concentration (ppm))*100. N2O make was also recorded as concentration in ppm Table 3 contains the DeNOx activity after aging at 200 and 450° C. of catalyst example 6 and catalyst comparative examples 3 and 4 as measured on this extrudate-based reactor.

TABLE 3

DeNOx activity of extrudate catalyst at
200 and 450° C. after hydrothermal aging.

| Example | Catalyst. 6 | Catalyst comp. 3 | Catalyst comp. 4 |
|---|---|---|---|
| Aged 200° C. NO conversion (%) | 74 | 65 | 72 |
| Aged 450° C. NO conversion (%) | 74 | 69 | 76 |

5 Further Characterizations 5.1 H₂ Temperature Programmed Reduction (H₂-TPR)

In order to characterize the state of Cu, H2-TPR spectra were taken of examples #2 through #4 as described above. FIG. 1 and Table 4 shows the hydrogen consumption measured as a function of temperature for examples #2, #3, and #4 (effect of CuO loading). There are two main reduction signals: a low temperature signal I at around 190° C. and a high temperature signal II. The H₂ consumption in these samples corresponds to a complete reduction of $Cu^{2+}$ to $Cu^0$. Hydrogen consumption signals I and II can be interpreted as a two step-reduction of cupric ions to Cu metal, signal I corresponding to the reduction of $Cu^{2+}$ to $Cu^+$ ions (reaction 1), and signal II to the reduction of $Cu^+$ ions to $Cu^0$ metal (reaction 3). Signal I may also contain contributions from CuO which is reduced in one step at about 200° C. to 220° C. to Cu metal (reaction 2).

Signal I:
1) $Cu^{2+}+\frac{1}{2}H_2=Cu^++H^+$
2) $CuO+H_2=Cu+H_2O$

Signal II:
3) $Cu^++\frac{1}{2}H_2=Cu+H^+$

TABLE 4

H₂-TPR of examples #2 through #4

| examples | Maximum of signal II, H₂-TPR (° C.) |
|---|---|
| #2 | 490 |
| #3 | 550 |
| #4 | 590 |

5.2 Characterization by UV-Vis Spectroscopy

Figure 2:
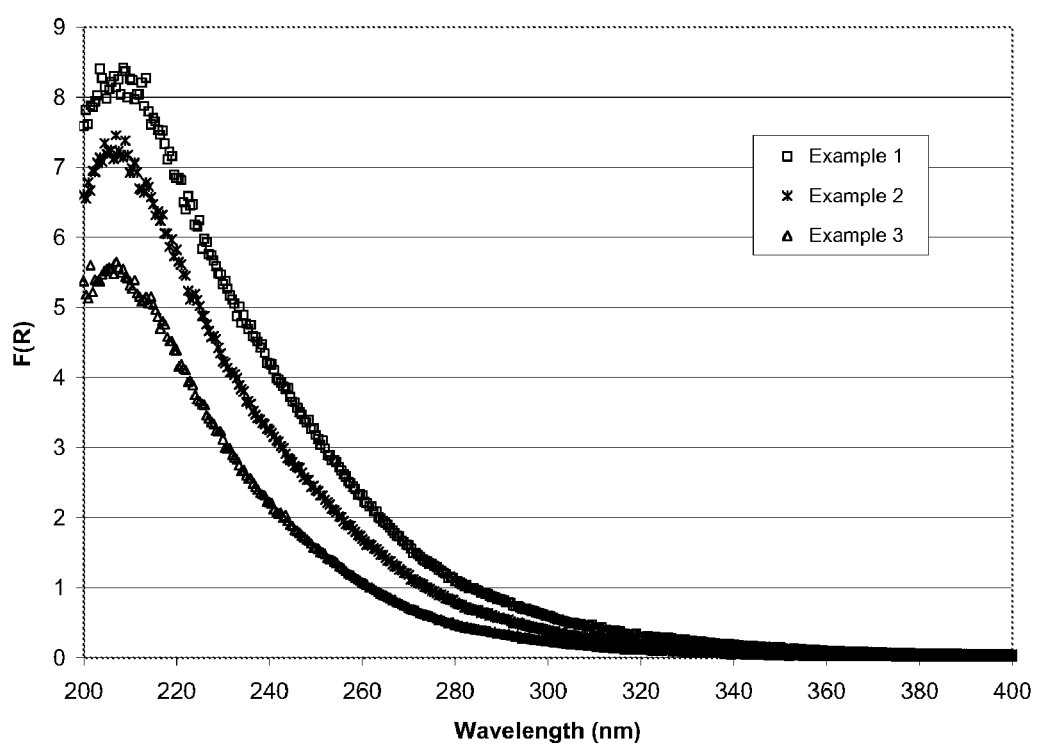
FIG. 2 is a UV-VIS spectra for examples #2 through #4.

FIG. 2 and Table 5 shows UV-vis spectra of examples #2 through #4 after aging for 6 h at 850° C. All spectra have the common feature of a principal charge transfer (CT) band around 205-210 nm This band can be attributed to an electronic transition from oxygen ligands to divalent copper ions.

TABLE 5

UV-vis spectra of examples #2 through #4

| examples | UV-vis half-height-half-width wavelength (nm) |
|---|---|
| #2 | 34 |
| #3 | 28 |
| #4 | 26 |

Figure 3:
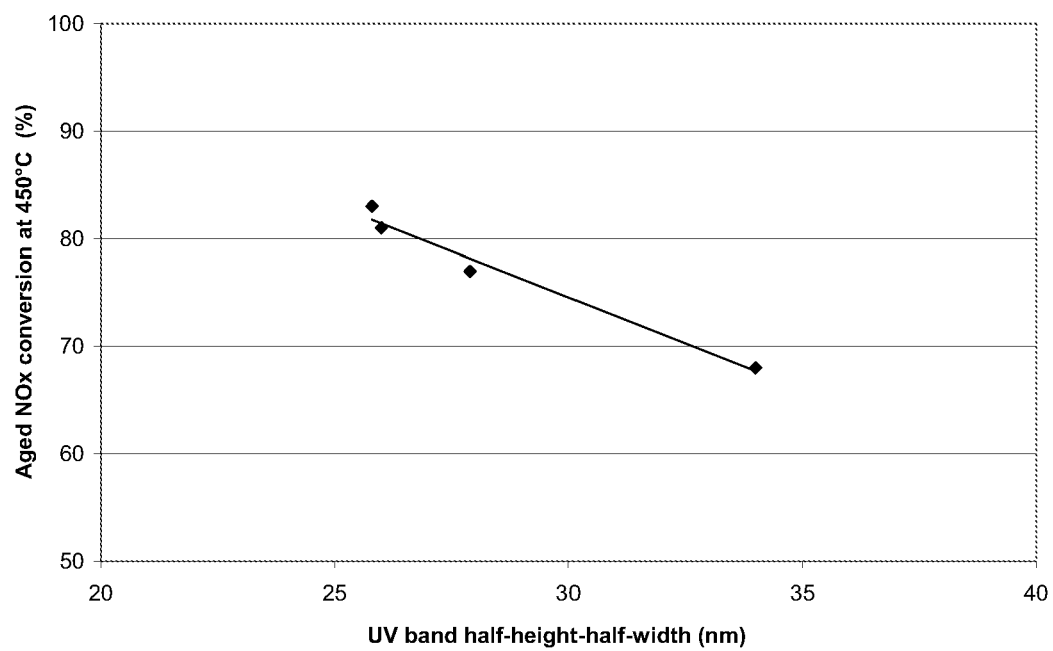
FIG. 3 is a graph showing the relationship between the half-height-half-width of the UV-band and NOx conversion at 450° C.

FIG. 3 shows a relationship between the half-height-half-width of the UV-band and NOx conversion at 450° C.

6. Examples 7 and 8 pH adjustment of Direct Copper Acetate Exchange of Na-Form 6.1 Reagents and Suspension Preparation
The following starting materials were employed:
Copper Acetate Monohydrate
Acetic acid
Deionized water
Sodium Chabazite from example 1A 6.2 Ion-Exchange Conditions and Chemical Analysis
Table 6 lists the important synthesis parameters for the ion-exchange. All process steps for these samples are as described in example 2.1.2. Example 7 has no addition of acetic acid to the exchange suspension, whereas example 8 has an additional amount of acetic acid added to adjust the pH. The pH of the solution was adjusted from 5.2 to 4.7 prior to the addition of the Na-CHA.

The CuO, Na2O, and Al2O3 content of the Cu-CHA filtercake samples were determined as described in 2.1.2.

TABLE 6

Copper acetate exchange condition, yield and chemical analysis for direct exchange of NaCHA with pH adjustment using acetic acid.

| Example | 7 | 8 |
|---|---|---|
| Copper Concentration (mol/l) | 0.2 | 0.2 |
| Cu:Al (molar ratio) | 1.2 | 1.2 |
| Acetic acid concentration (mol/l) | 0 | 0.07 |
| pH of copper solution | 5.2 | 4.7 |
| CuO in zeolite (wt %) | 3.26 | 2.75 |
| Na2O in zeolite (ppm) | 110 | 189 |
| Cu yield (%) | 35 | 29 |

6.3 Coating of Catalyst

The coated catalyst was prepared as described in example 3.1.

6.4 Aging and Catalytic Testing

Aging and catalytic testing protocol are described in example 3.2 (core-based reactor). Table 7 contains the DeNOx activity after aging at 200 and 450° C.

TABLE 7

DeNOx activity of coated catalyst at 200 and 450° C. after hydrothermal aging

| Example | Catalyst 7 | Catalyst. 8 |
|---|---|---|
| Aged 200° C. NOx conversion (%) | 57 | 62 |
| Aged 450° C. NOx conversion (%) | 73 | 80 |

7. Direct Exchange of Na-Form with Ammoniacal Solution of Copper

7.1 Example 9

60° C. Direct Exchange of Na-Form with Ammoniacal Solution of Copper

7.1.1 Reagents and Suspension Preparation

The following starting materials were employed:
Aqueous solution of Cu(NH3)4 (14.6 wt % Cu)
Deionized water
Sodium Chabazite from example 1B

7.1.2 Ion-Exchange Conditions and Chemical Analysis 360 g of the Na-CHA were immersed into 2880 ml of 0.05 M copper tetraamine solution at 60° C. and stirred in a jacketed 4 L glass reactor. The volume of the exchange slurry was kept constant at a liquid:solid ratio of 8:1. The pH value was 12. The exchange slurry was kept for 8 hours at this temperature, and then filtered hot over a 33 cm diameter Buechner funnel using 541 Whatmann filterpaper (>25 μm filtration). The filtercake was then washed until the conductivity of the washwater reached 200 μScm−1. The sample was washed with room temperature washwater.

Chemical analysis indicated 3.19 wt % CuO and 1884 ppm Na2O, reported on a volatile-free basis. The SiO2:Al2O3 of the product was 32.3.

The Cu yield was 100%.

7.2 Example 10

Room Temperature Direct Exchange of Na-Form with Ammoniacal Solution of Copper

7.2.1 Reagents and Suspension Preparation

The following starting materials were employed:
Aqueous solution of Cu(NH3)4 (14.6 wt % Cu)
Deionized water
Sodium Chabazite from example 1B

7.2.2 Ion-Exchange Conditions and Chemical Analysis 360 g of the Na-CHA were immersed into 2880 ml of 0.05 M copper tetraamine solution at room temperature (~25° C.) and stirred in a jacketed 4 L glass reactor. The pH of the copper tetraamine solution prior to addition of zeolite was measured as 10.5. The volume of the exchange slurry was kept constant at a liquid:solid ratio of 8:1. The exchange slurry was kept for 6 hours at this temperature (pH at the end of the reaction was 8.6), and then filtered hot over a 33 cm diameter Buechner funnel using 541 Whatmann filterpaper (>25 μm filtration). The filtercake was then washed until the conductivity of the washwater reached 200 μScm−1. The sample was washed with room temperature washwater.

Chemical analysis indicated 3.15 wt % CuO and 1393 ppm Na2O, reported on a volatile-free basis. This example indicates the advantage of lower temperatures for improved removal of Na. The SiO2:Al2O3 of the product was 31.3.

The Cu yield was 99%.

7.3 Preparation of Catalyst

Examples 9 and 10

The extrudate-based catalyst was prepared as described in example 4.1.

7.3.1 Aging and Catalytic Testing

Aging and catalytic testing protocol are described in example 4.2 (extrudate-based reactor). Table 8 contains the DeNOx activity after aging at 200 and 450° C. Comparative examples shown in Table 3.

TABLE 8

DeNOx activity of coated catalyst at 200 and 450° C. after hydrothermal aging

| Example | 9 | 10 |
|---|---|---|
| Aged 200° C. NOx conversion (%) | 53 | 67 |
| Aged 450° C. NOx conversion (%) | 65 | 73 |

8. Ratios Cu:Al, Na:Al and Cu:Na

Table 9 contains the ratios Cu:Al, Na:Al and Cu:Na of all Chabazite molecular sieve mentioned in the above described examples.

TABLE 9

Cu:Al, Na:Al and Cu:Na ratios

| Example | Cu:Al | Na:Al | Cu:Na |
|---|---|---|---|
| comparative e.g. 1 | 0.3 | ND | N/A |
| comparative e.g. 2 | 0.38 | 0.004 | 240 |
| comparative e.g. 3 | 0.48 | ND | N/A |
| comparative e.g. 4 | 0.44 | ND | N/A |
| example #2 | 0.48 | 0.002 | 240 |
| example #3 | 0.37 | 0.01 | 37 |
| example #4 | 0.3 | 0.027 | 11 |
| example #5 | 0.38 | 0.005 | 76 |
| example #6 | 0.46 | 0.011 | 43 |
| example #7 | 0.43 | 0.004 | 108 |
| example #8 | 0.36 | 0.006 | 60 |
| example #9 | 0.43 | 0.065 | 7 |
| example #10 | 0.41 | 0.046 | 9 |

ND = not disclosed, N/A = not applicable
[Cu:Na-1:200; 2:200; 5:200; 10:200 (most preferred)]

The invention claimed is:

1. A process for the preparation of copper containing molecular sieve with the CHA structure having a silica to alumina mole ratio greater than about 10, comprising exchanging the copper into $Na^+$-form of the molecular sieve with the CHA structure having a silica to alumina mole ratio greater than about 10, using a liquid copper solution wherein the concentration of copper is in the range of about 0.001 to about 0.4 molar.

2. The process of claim 1, wherein the liquid to solid ratio which is defined as the weight of water used to prepare the Cu solution relative to the weight of the starting zeolite used in the copper exchange step is in the range from about 2 to about 80.

3. The process of claim 1, wherein the reaction temperature of the copper-exchange step is in the range of about 10 to about 100° C.

4. The process of claim 2, wherein copper acetate or an ammoniacal solution of copper ions is used as copper source.

5. The process of claim 3, wherein the concentration of copper is in the range of about 0.075 to about 0.3 molar.

6. A copper containing molecular sieve with the CHA structure, made by the process of claim 1.

7. A synthetic copper containing molecular sieve with the CHA structure, wherein the synthetic copper containing molecular sieve with the CHA structure shows at least two signals in a $H_2$ TPR spectra, wherein the maximum of signal I is in the range from about 25 to about 400° C. and the maximum of signal II is in the range from about 475° C. to about 800° C. and the molecular sieve has a sodium content below 2 wt.-%.

8. The copper containing molecular sieve of claim 7, wherein the molecular sieve has a sodium content of less than about 2500 ppm.

9. The copper containing molecular sieve with the CHA structure of claim 8, wherein the copper containing molecular sieve with the CHA structure has a UV-VIS half-height-half-width wavelength in the range from about 15 to about 35 nm.

10. The copper containing molecular sieve with the CHA structure of claim 9, having a weight ratio of exchanged copper to copper oxide of at least about 1.

11. The copper containing molecular sieve with the CHA structure of claim 10, wherein that copper containing molecular sieve with the CHA structure shows at least one peak in diffuse reflectance FT-IR spectroscopy method at about 1948 $cm^{-1}$.

12. A copper containing molecular sieve with the CHA structure of claim 8 having a copper content, calculated as CuO, of at least 1.5 wt.-%, based on the total weight of the calcined zeolite, wherein the atomic ratio of copper to sodium is greater than 0.5 and up to 200 and the weight ratio of exchanged copper to copper oxide of at least about 1.

13. A catalyst containing a copper containing molecular sieve with the CHA structure of claim 7 disposed on a substrate.

14. The catalyst of claim 13, wherein the molecular sieve with the CHA structure is zeolitic Chabazite with a silica to alumina mole ratio in the range of about 15 to about 40 and a copper to aluminum atomic ratio in the range of about 0.25 and about 0.50.

15. The catalyst of claim 13, wherein the catalyst is disposed on a honeycomb substrate for use in the selective reduction (SCR) of nitrogen oxides in an exhaust gas stream.

16. An exhaust gas treatment system comprising an exhaust gas stream containing ammonia and/or urea and at least a catalyst containing a copper containing molecular sieve with the CHA structure of made by the process of claim 1.

17. An exhaust gas treatment system comprising an exhaust gas stream containing ammonia and/or urea and at least a catalyst containing a catalyst in accordance with claim 13.

18. An exhaust gas treatment system comprising an exhaust gas stream containing ammonia and/or urea and at least a catalyst containing a catalyst in accordance with claim 15.

19. A method of selectively reducing nitrogen oxides ($NO_x$), comprising contacting a gaseous stream containing nitrogen oxides, with a catalyst containing a catalyst in accordance with claim 13.

20. A method of selectively reducing nitrogen oxides, comprising contacting a gaseous stream containing nitrogen oxides, with a catalyst containing a catalyst in accordance with claim 15.

* * * * *